US008428785B2

(12) United States Patent
Boucher et al.

(10) Patent No.: US 8,428,785 B2
(45) Date of Patent: Apr. 23, 2013

(54) ENTERPRISE ENERGY AUTOMATION

(76) Inventors: Rodney M. Boucher, San Jose, CA (US); Gene J. Ameduri, Poland, OH (US); Vincent J. Cushing, Jr., Chicago, IL (US)

(*) Notice: Subject to any disclaimer, the term of this patent is extended or adjusted under 35 U.S.C. 154(b) by 206 days.

(21) Appl. No.: 12/270,308

(22) Filed: Nov. 13, 2008

(65) Prior Publication Data

US 2009/0254225 A1 Oct. 8, 2009

Related U.S. Application Data

(63) Continuation of application No. 11/107,222, filed on Apr. 15, 2005, now abandoned.

(60) Provisional application No. 60/562,691, filed on Apr. 16, 2004.

(51) Int. Cl.
G05D 11/00 (2006.01)

(52) U.S. Cl.
USPC ............. 700/295; 700/29; 700/291; 700/296; 700/297; 705/412

(58) Field of Classification Search .......... 700/295–296, 700/29, 286, 291, 297; 705/412
See application file for complete search history.

(56) References Cited

U.S. PATENT DOCUMENTS

| 4,749,992 A | 6/1988 | Fitzemeyer et al. |
| 5,566,084 A | 10/1996 | Cmar |
| 6,493,643 B1 | 12/2002 | Aisa |
| 6,528,957 B1 | 3/2003 | Luchaco |
| 6,583,521 B1 | 6/2003 | Lagod et al. |
| 6,633,823 B2 | 10/2003 | Bartone et al. |
| 6,681,156 B1 | 1/2004 | Weiss |
| 6,701,298 B1 | 3/2004 | Jutsen |
| 7,343,360 B1* | 3/2008 | Ristanovic et al. ........... 705/412 |
| 2003/0050737 A1 | 3/2003 | Osann, Jr. |
| 2003/0171851 A1 | 9/2003 | Brickfield et al. |
| 2004/0024685 A1* | 2/2004 | Peljto .............................. 705/37 |
| 2004/0095237 A1* | 5/2004 | Chen et al. ..................... 340/506 |
| 2004/0111226 A1* | 6/2004 | Brewster et al. ................ 702/61 |
| 2004/0133314 A1* | 7/2004 | Ehlers et al. .................. 700/276 |

OTHER PUBLICATIONS

Office Action for U.S. Appl. No. 11/107,222, dated May 15, 2008, 18 pages.

* cited by examiner

Primary Examiner — Tejal Gami
Assistant Examiner — Nathan Laughlin
(74) Attorney, Agent, or Firm — Foley & Lardner LLP

(57) ABSTRACT

The preferred embodiments described herein relate to enterprise energy automation. In one preferred embodiment, a method for enterprise energy automation is provided. In another preferred embodiment, a method for delivering ancillary services to an energy supply and delivery system by a group of buildings is provided. In yet another preferred embodiment, a method for integrating an energy automation system is provided. Other preferred embodiments are also provided.

14 Claims, 25 Drawing Sheets

Energy Automation vs. Tariff-based Operation
NYC Commercial Building – 1 MW

|  | Economic Operation | | Tariff Operation | |
|---|---|---|---|---|
|  | $ | % of pre- | $ | $ |
| *Economies* | Reduction | shift tariff | Pre-shift | Reduction |
| Energy | 3,746 |  |  |  |
|    Distribution losses | 258 |  |  |  |
|    kVAr losses | 627 |  |  |  |
|    Regulation | 169 |  |  |  |
|    Energy risk mgt | - |  |  |  |
|    Subtotal | 4,801 | 3% | 91,838 | 1,011 |
| Capacity | 7,866 | 5% | 19,088 | (5,219) |
| Transmission | 3,168 | 2% | 15,089 | (3,709) |
| Distribution | 15,000 | 10% | 28,349 | (7,363) |
|    Total | $30,835 | 20% | $154,364 | ($15,279) |
| *Sales* |  |  |  |  |
| Spinning reserve | 19,455 | 13% |  |  |
| Regulation | - | 0% |  |  |
|    Total | $19,455 | 13% |  |  |
| *Total Savings*: | $50,000 | or 33% of the pre-shift tariff | | |

Figure 10

ENTERPRISE ENERGY AUTOMATION

CROSS-REFERENCE TO RELATED APPLICATIONS

This application is a continuation of U.S. patent application Ser. No. 11/107,222, filed Apr. 15, 2005, now abandoned which claims the benefit of U.S. Provisional Application No. 60/562,691, filed Apr. 16, 2004, both of which are hereby incorporated by reference.

BACKGROUND

It would be desirable to provide a process for leveraging the convergence of new technologies and market metrics to provide major energy economies to commercial buildings.

SUMMARY

The present invention is defined by the following claims, and nothing in this section should be taken as a limitation on those claims.

By way of introduction, the preferred embodiments described below relate to enterprise energy automation. In one preferred embodiment, a method for enterprise energy automation is provided. In another preferred embodiment, a method for delivering ancillary services to an energy supply and delivery system by a group of buildings is provided. In yet another preferred embodiment, a method for integrating an energy automation system is provided. Other preferred embodiments are also provided.

The preferred embodiments will now be described with reference to the attached drawings.

BRIEF DESCRIPTION OF THE DRAWINGS

FIG. 10 is a table of energy automation versus tariff-based operations.

DETAILED DESCRIPTION OF THE PRESENTLY PREFERRED EMBODIMENTS

Introduction

By way of introduction, the preferred embodiments described below are directed to Enterprise Energy Automation, which is the process for leveraging the convergence of new technologies and market metrics to provide major energy economies to commercial buildings. Enterprise Energy Automation provides the means by which customers, suppliers, and deliverers include all components of energy cost incurrence on both sides of the meter in their investment and operating decisions. Weekly, daily, hourly, and minute-to-minute, through Energy Automation, economies of 20 to 40% can be continuously and relentlessly wrung out and distributed. Enterprise Energy Automation enables the realization of previously untapped economic and reliability benefits—benefits long concealed by the utility-customer tariff relationship. Enterprise Energy Automation is particularly advantageous in major metropolitan areas with persistently high energy supply prices. Target customers are commercial buildings—and their energy service providers, building automation contractors, utilities, and regional operators.

Figure 1:
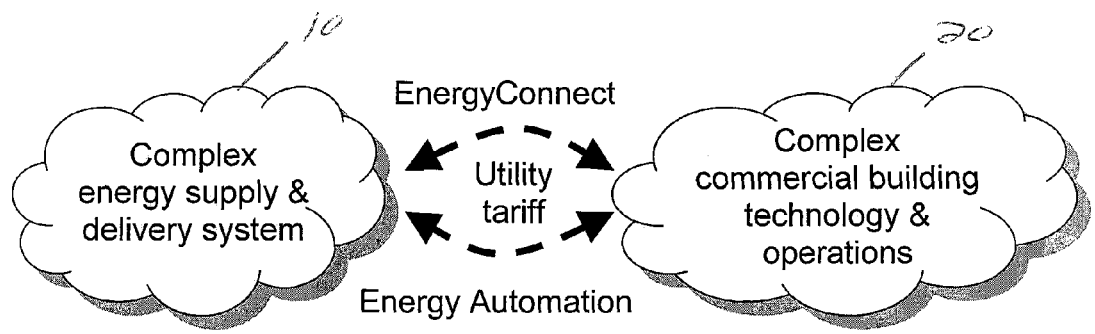
FIG. 1 is a schematic of an energy automation process of a preferred embodiment.

This detailed description will first describe the components and operation of a presently preferred system for implementing Enterprise Energy Automation. The detailed description will then describe the products, services, and long-term option values that can be provided through Enterprise Energy Automation Enterprise Energy Automation System Turning now to the drawings, FIG. 1 is a schematic of an energy automation process of a preferred embodiment. As shown in this schematic, an energy automation process interacts with a complex energy supply and delivery system 10 and complex commercial building technology and operations 20. The term "EnergyConnect" used in this figure and in this description refers to the name of the assignee of the present patent application. Although "EnergyConnect" (or "ECI") is used in these preferred embodiments to refer to the entity providing the energy automation system/process, it should be understood that other entities can implement the disclosed embodiments, with the appropriate licenses.

Figure 2:
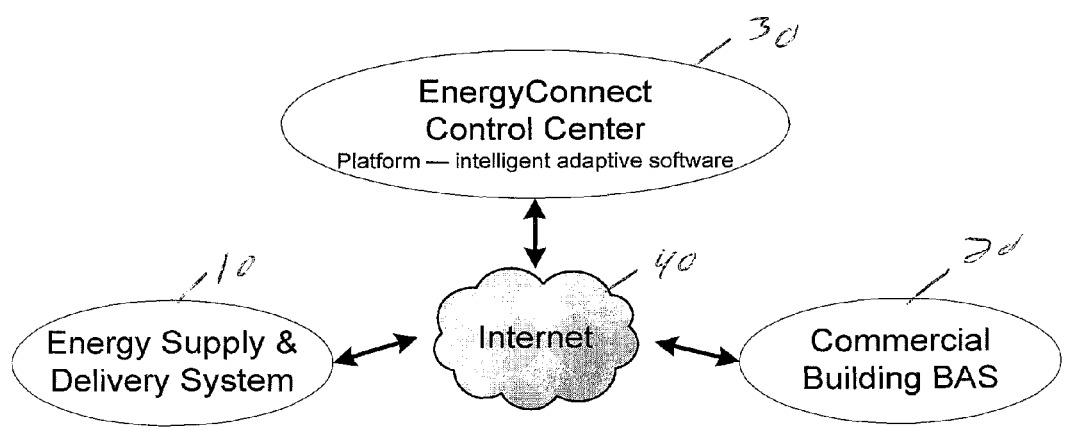
FIG. 2 is a diagram of an energy automation system of a preferred embodiment.

Referring again to the drawings, FIG. 2 is a more detailed diagram of the energy automation system. As shown in FIG. 2, the energy supply and delivery system 10 and a commercial building BAS (building automation system) 20 communicates with a control center 30 via a network 40 (here, the Internet). The energy automation system integrates an intelligent software solution, a network, a gateway and graphical user interface, and a supply and delivery system interface. The intelligent software solution analyzes and executes various cost avoidance and revenue-enhancing strategies, performs data collection and monitoring, and comprises benefit/risk sharing protocols, all to balance energy and comfort decisions. The network 40 allows each building to communicate over secure high-speed internet or customer intranet with the national control center 30. The gateway and graphical user interface is located at each building, streamlining and easing the communication, information, and control functions with BAS and building management. The supply and delivery system interface is a direct, reliable, and secure communication with utilities, distribution service entities, regional transmission organizations, and other supply entities.

The control center 30 comprises a platform with intelligent adaptive software that electronically integrates the energy production/delivery systems and customers' energy using equipment. More specifically, the platform acquires and delivers reliable real-time electronic data and control signals. Data transfer will occur in near real-time and with reliability consistent with that presently required for energy system and energy market operations. Most of the necessary energy system and energy market data is readily available, as it is already used for system operation. Some energy system data, e.g. LMP, is becoming available with the advent of independent system operators (ISO). The necessary customer data is available from large buildings with BAS, and is gradually becoming available from smaller buildings as BAS prices drop and hourly metering is deployed by utilities. The platform also decides the optimum operation of a portfolio of customers' equipment. The platform dispatches the portfolio in a manner that (1) maximizes profit from among several competing energy system and energy market opportunities, (2) dependably performs all energy system reliability functions, and (3) maintains building comfort. Decisions are required in several time-frames. For example, electric capacity may require annual or monthly commitment. Electric system ancillary services may require day-ahead commitment. Operating to economy energy prices requires daily, hourly, and real-time decisions. The platform also performs accounting and billing consistent with protocols and provides feedback, monitoring, and reporting.

The platform enables powerful "products" that reduce supply and delivery costs and increase commercial building, BAS, and communications systems values by reducing current and expected energy expense and by reducing pressure on suppliers and distribution systems. These products will be discussed in more detail below. Preparatory to providing initial Energy Automation products and services, EnergyConnect provides services to assure that customer facilities are doing the basic blocking and tackling of energy management. They include "tuning" HVAC and BAS equipment to meet design performance, installing "enterprise" energy reporting software, upgrading to state-of-the-art BAS, as necessary to execute Energy Automation strategies and including project finance if preferred, and controlling energy use against utility tariffs. These basic services provide several benefits, including creating additional energy savings for many customers, as much as 10%.

Figure 3:
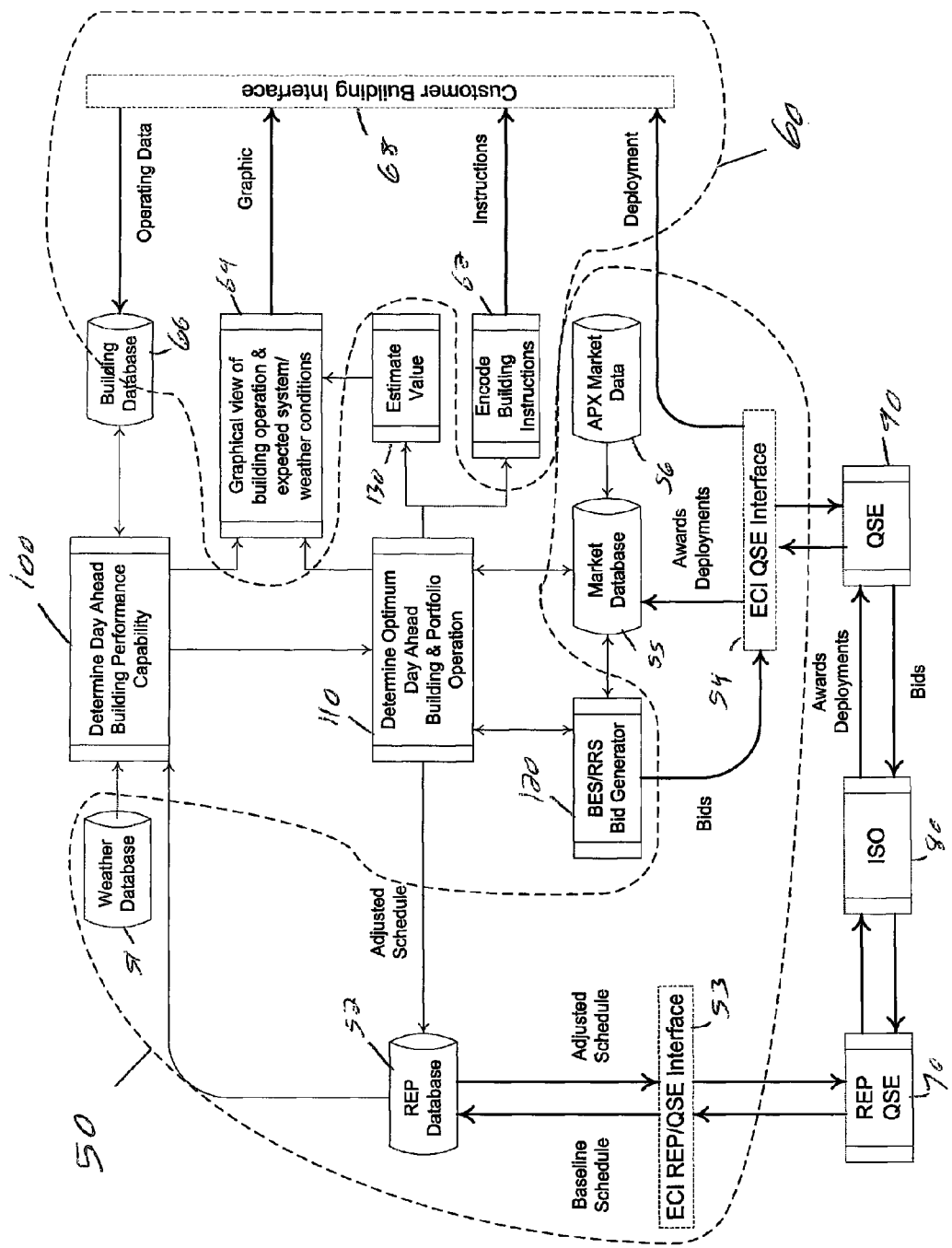
FIG. 3 is a block diagram of an energy automation system of a preferred embodiment.

Turning again to the drawings, FIG. 3 is a block diagram of an energy automation system of a preferred embodiment. This system comprises an electric system markets and operations interface 50 and a building interface 60. The electric system markets and operations interface 50 comprises a weather database 51, an REP database 52, an ECI REP/QSE interface 53, an ECI QSE interface 54, a market database 55, and an APX market database 56. The building interface 60 comprises a module that encodes building instructions 62, a module that provides a graphical view of building operations and expected system/weather conditions 64, a building database 66, and a customer building interface 68. The system also includes an REP QSE module 70, an ISO 80, a QSE module 90, a module that determines day ahead building performance capability 100, a module that determines optimum day ahead building and portfolio operation 110, and a module that estimates value 130.

The building control and portfolio optimization software will determine the portfolio building operation that maximizes value against market, supplier, and utility prices. The diagram depicts a "day-ahead" process. The "day-ahead" strategy will anticipate and reflect (a) expected conditions for the next day and (b) prior long-term or seasonal commitments to each building's supplier or to the ISO 80. A similar "short-term" process will continually update and communicate an optimum strategy for the next few hours. The "short-term" strategy will anticipate and reflect (a) actual conditions as they unfold during the day and (b) prior long-term and short-term commitments to each building's supplier or to the ISO 80. Both the "day-ahead" and "short-term" processes entail two steps.

The first step is to determine day ahead building performance capability. This determines load shifting and response capability of each building based on, for example, (a) an ability to execute pre-defined strategies that have been defined and tested in advance consistent with (1) building and HVAC system character and (2) BAS and communications capability, (b) expected weather (temperature, humidity) and occupancy, (c) historical performance under similar weather and occupancy conditions, and (d) as modified by a building engineer, current status input. In this embodiment, there are several pre-defined strategies in the building database 66. These include day-ahead shifting to market price (e.g., shift load from afternoon (high prices) to morning (low prices) to early morning (even lower prices) in order to minimize energy expense with day-ahead notification), Chicago shaping and imbalance (similar to "shifting" but in illiquid Chicago hourly market), real-time shifting (a variation on "shifting," i.e. also be prepared to shift the same day, within the afternoon, in response to electric system events/prices), spinning reserve (be prepared to drop significant load, 10± minutes, randomly, approx. 10× during summer, between noon and 6 pm), demand limiting (augment "shifting" strategy with peak demand control), and curtailment (extended peak curtailment, approx. 5 hottest days, commitment made from portfolio).

Step one determines a model for each building that is one input to the optimization model. For example, to facilitate a predefined day ahead load-shifting strategy, the model considers magnitude and timing leeway for load shifting, inefficiency of precooling in advance of need, efficiency of cooling during lower ambient temperature hours, and delivery tariff constraints. The building models are then combined to create a single model of the building portfolio, also for input and analysis by the optimization model.

The building model defines the current flexibility of a building and of a building portfolio to (a) shift HVAC-related electrical load and (b) curtail lighting and other loads—to accommodate hourly energy prices—on both a day-ahead and real-time basis. Similarly, the model defines the current ability of a building and of a building portfolio to provide ancillary services to an ISO.

Figure 4:
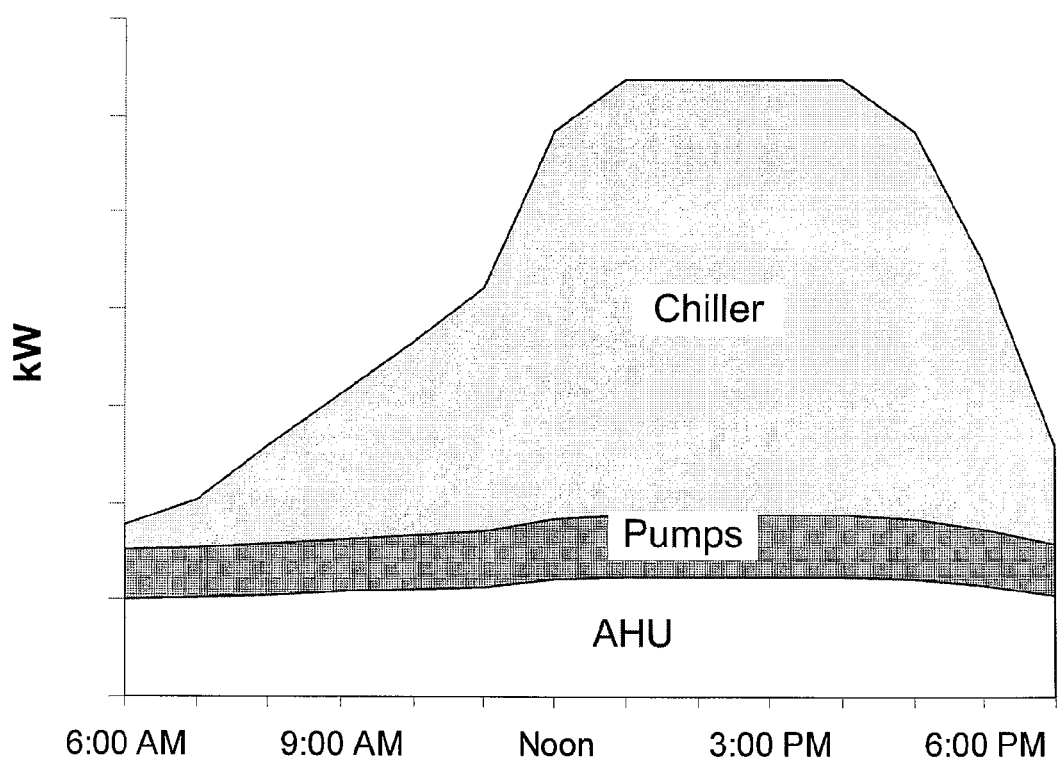
FIG. 4 is a graph of building electrical load.

FIG. 4 is a graph of building electrical load. In this graph, kW is a function of outdoor dry bulb T, outdoor dew-point T, solar load, wind speed, internal electrical equipment and lighting load, hour, and season. The chillers have a slower response and longer duration, i.e. primary basis for load-shifting and secondary basis for ancillary services. The pumps/AHU have fast response and are able to shift load around if integrates to (approx.) zero over small time period, i.e. ancillary services.

ECI considers several building characteristics in mapping building electrical equipment and loads to electric system markets and operations. These characteristics include speed of response (e.g., kW/minute or kW/second), advance notice required (e.g., seconds, minutes, hours, day), duration of response (e.g., ability to accommodate 10 minute, 15 minute, hourly, or multi-hour thermal-related load-shifts), time interval of response (e.g., ability to shift thermal-related load back 1 hour, 2 hours, etc.), magnitude of response (e.g., add a second dimension to each of the above parameters; how many kW does that speed, notice, etc. apply to), inefficiency/efficiency of response (e.g., define efficiency loss incurred by change from historical HVAC operation that tracks building thermal load or efficiency gain obtained by operating HVAC equipment in hours with more favorable ambient conditions), and other thermal character (e.g., thermal inertia, recovery ability).

Modeling of buildings for various purposes is well developed. Modeling of a building in a manner that reveals the characteristics listed above is not well developed. The ECI building model will adapt existing building model technology to this purpose. The ECI building model is also characterized by inverse (the input and output variables are known and measured, and the objective is to determine a mathematical description of the system and to estimate the system parameters), dynamic (use transfer functions where the thermal mass of a building is sufficiently significant to delay the heat gains or losses), and system level (a model of the entire building, not an assembly of component models of the HVAC system. "Component" modeling may reside in the building automation systems to more efficiently adapt building loads to hourly and subhourly electric market prices and operations control signals). (The descriptions of inverse and dynamic stated above are from ASHRAE Handbook, Chapter 31, "Energy Estimating and modeling Methods").

Step two determine optimum day ahead building and portfolio operation by determining optimum operation of the building portfolio and optimum operation of each stand-alone building. Inputs to the optimization model include, for example, (a) a model of each building and of the building portfolio and (b) market prices for energy, capacity, and ancillary services (or alternative supplier price/value indicators). Optimization criteria include ST revenue maximization, LT revenue maximization (ISO program enrollment in advance of year or season), LT margin maximization (margin takes into consideration whether capital or opportunity costs are incurred), option value (for example, putting thermal energy in the bank in order to be able to take advantage of short-notice price spikes), and minimum threshold (reflect minimum value or margin of error, and diminishing returns).

The value in portfolio optimization includes the following: map buildings to opportunity (e.g. revenue maximization), reserves (portfolio reliability/diversity enables firm commitment), shared portfolio reserves (probably using most versatile buildings), scale (e.g. to meet ISO MW thresholds; to affect local price and utility investment; to spread fixed costs over wider base; for bargaining power or influence in developing market), internal market (avoids external transaction costs and supports fractional or kW trades), and support common interests of commercial building sector (market rules and development; who keeps what share of benefits; unfragmented market development; avoidance of supplier switching costs).

Portfolio optimization enables mapping of sophisticated buildings to sophisticated (not necessarily high margin or high revenue) uses in order to maximize portfolio revenue. For example, the most versatile buildings may provide spinning reserve services while also providing "portfolio reserves" to backup multiple other portfolio services being sold off of other buildings. Building sophistication or versatility may be defined in terms of 1) communications speed and reliability; 2) RT/ST intra-day flexibility; 3) building thermal inertia or recovery ability; 4) thermal storage; and 5) building engineer preferences. Such criteria may be satisfied through staged optimization. First, optimally shift each building's thermal load independently to accommodate hourly prices, day ahead (DAH), while respecting demand features of energy supplier contract and utility delivery tariff. Second, modify DAH for LT commitments & associated reserves. Third, modify DAH to anticipate ST products & associated reserves (involving product bids to ISO, anticipating awards or not resulting from such bids, and anticipating a fallback ST load-shifting strategy in the event that a bid is not successful). Fourth, modify DAH for 3-hour ahead events and price changes. This model eventually anticipates and takes advantage of others' independent, non-portfolio building actions.

Eventually, the basic precooling strategy becomes the baseline—around market prices and processed directly by the supplier and customer. EnergyConnect then determines the optimum change to the scheduled load, as needed to provide portfolio services, and pays the customer for the value of such portfolio service. (Under this scheme, suppliers and their customers will have a disincentive to falsify this new baseline because ECI may well decide not to change the baseline schedule. Regarding distributed analysis/decision-making, (a) ECI optimization software estimates basic load shifting strategy to accommodate hourly prices, (b) building BAS determines actual response to hourly energy prices (that is, for those buildings assigned to a simple price-based, load-shifting strategy, ECI provides a price profile to each building BAS system and the precise load shifting strategy is determined by a local algorithm that can more efficiently and accurately adapt to real-time building conditions), and (c) the ECI building model learns building capability over time, so that estimates get better over time. Also, the BES/RRS bid generator 120 is an example of a market application that could be better developed (and brought to market faster) if outsourced or codeveloped by an ECI partner with hands-on commercial experience in the ERCOT market.

The following paragraphs will describe other components of the system shown in FIG. 3.

Estimate Value Module 130

A simple algorithm to indicate to building engineers in real time the value of actions that they are being asked to take with their building systems. For example, this can be a specific dollar value or a "high", "moderate", "low" designation.

BES/RRS Bid Generator 120

This software performs two functions. First, as an input to the optimization software 110, it estimates "winning" bid prices. Second, for transmittal to the QSE 90, it executes a bid strategy. In production mode, estimates of "winning" bid prices are based on an analysis of awards, including recent history and under similar seasonal, weather, and ISO operating conditions. In a presently preferred embodiment, ECI will conduct weekly or daily trials by simply adopting the actual winning bids as if they were ECI bids. This objective is to demonstrate and test the ability of buildings to participate in these markets and to qualify the building portfolio to participate subsequently in other markets.

The database software will support all Energy Automation functions: building control & portfolio optimization; scorecard; accounting; and business/product development.

Building Database 66

The building database 66 has the following content: energy profile (daily, seasonal, current; volatility; kWh, kW, therms, Btu; main and submeter data; and billing data), monitored building and building HVAC data (provided by a BAS system), mechanical and BAS (type, size, vintage, available control and telemetry, design capability, communications protocol), load flexibility (response speed, duration, notice requirement, load shift magnitude, load shift frequency, load shift cost (e.g. losses from precooling, tenant discomfort, equipment wear/tear)), performance history (accumulate a record of actual response to actual Energy Automation control, to eventually provide a "learned" building capability profile over a wide range of conditions), on-site generation (type, available control, design capability, etc.), current building equipment status (as updated by building engineers or continually by monitoring through BAS system), and a library of commands to commercial buildings. In one embodiment, EnergyConnect will work with all participants (buildings owners, energy service providers, scheduling coordinators, etc.) to define a collection of acceptable load shifting commands, actions, and strategies that are available to Energy Automation building control and optimization software. Eventually, this collection will evolve, expand, and automate as EnergyConnect builds and records experience for a wide range of commercial building character under a wide range of conditions.

Weather Database 51

The weather database 51 stores hourly temperature, humidity, wind speed, frontal passage, etc.—both forecast (48/168 hours) and history. The weather database 51 also stores HDD, CDD history for each market.

The following table shows database dimensions/scale.

|  | 2004 | 2005 | 2006 | 2007 |
|---|---|---|---|---|
| Forecast | | | | |
| MW | 30 | 180 | 360 | 1,620 |
| MWh (1000) | 105 | 683 | 1,577 | 6,307 |
| # of properties | 22 | 130 | 260 | 1200 |
| # of major metro areas | 2 | 6 | 8 | 10 |
| # of ISO's or regions | 2 | 5 | 6 | 7 |
| Building spec averages | | | | |
| # of buildings per property | 2 | | | |
| Sq ft per property | 325,000 | | | |
| Annual MWh per property | 6,000 | | | |
| Annual kWh/sq ft | 19 | | | |
| MW per property | 1.4 | | | |
| Portfolio participation (%) | | | | |
| Demand response program | 100 | 100 | 80 | 80 |
| Distribution system capital conservation | | | 5 | 10 |
| Price-response load shifting (DAH or BES) | 10 | 20 | 30 | 40 |
| Spinning reserve (RRS) | | 10 | 20 | 50 |

Market Database 55

The market database 55 stores prior portfolio and building commitments (current and historical bids and awards for BES and RRS, plus longer term commitments), market price and volatility (LMP and energy supplier price signals (electric and gas)), transmission congestion prices (DA, HA, RT (hourly), and RT (6 minute) prices; electric system conditions), yesterday's conditions (yesterday predicts today, at least as a start), ancillary services data (DA and RT prices, opportunity cost, control signals), and utility tariffs (delivery and supply tariffs, especially as a key driver of demand limiting strategies and as they constrain the flexibility of buildings to shift load from high to low-priced hours).

REP Database 52

The REP Database 52 stores the price or value signals provided by a building's supplier in lieu of, or to augment, market prices, baseline building load schedules, as determined by the supplier for its building customers (these schedules will be modified to reflect Energy Automation strategies), and adjusted building load schedules, as determined by ECI and transmitted to REP.

Operations Support Software

The Energy Automation administration database stores Energy Automation commands sent and verification of receipt, Energy Automation receipts and disbursements and the parameters behind them, and customer/supplier admin information. The scorecard software serves three functions (1) operational measurement & verification of performance (as a basis for distribution of revenues and against expected performance, to improve building database accuracy), (2) off-line analysis and development of alternative building control strategies (to test and continually improve the optimization software vs. independent, non-portfolio building operation), and (3) internal and external reporting. In regard to the development database, in order to continue development of the building model and the optimization model, ECI will need off-line access to some subset of the building, weather, and market databases.

Customer Building Interface 68

The customer building interface 68 encompasses several component. First, the customer building interface 68 comprises the hardware/software/communications interface between the ECI system and each building's BAS. The customer building interface 68 also comprises a graphical user interface that (a) indicates current status of assigned Energy Automation strategies and commands to a property's BAS, (b) displays current electric system operations and market conditions, weather, building, or other information (as necessary to inform building engineers as to how their buildings are creating value under today's conditions), and (c) displays and allows updating of ECI's building database content regarding their properties. The customer building interface 68 also automates retrieval and capture of BAS data in the Building Database and encodes building instructions—software that translates ECI building instructions (from the optimization model) into commands recognizable by each building's BAS. Inputs include, for example, standard commands (from building database), optimum portfolio operation (from optimization model), and optimum building operation (from optimization model). The customer building interface 68 also receives and interprets deployment signal—ECI will pass some ISO operating signals directly through to a building's BAS. For example, an ISO signal to deploy spinning reserve will require a real-time building response. In anticipation of such a deployment signal, ECI will have already transmitted instructions regarding the required building response.

In one implementation, for a few buildings, this interface is fully integrated with an existing BAS. This will enable evaluation of screen shots and other features. For other buildings, a less intrusive GUI, e.g. web access to an ECI screen, can be provided. In this implementation, ECI systems will not directly control BAS. One objective of such an implementation is to determine, with the building engineers, whether and to what extent ECI systems need to directly control BAS in a full production system. This means that, for this implementation, building engineers will have to take actions to implement assigned Energy Automation strategies. The interface design in this implementation can facilitate the building engineer's execution of such strategies. An exception to this is, to test the ability of buildings to participate in ERCOT ancillary services markets, those buildings will receive ISO deployment signals. For all buildings in this implementation, the system will automatically obtain and store key building information via the BAS.

The following table shows the initial definition of building data for retrieval through BAS system. Standard commands can either be universally interpreted by each building's BAS and/or custom to each building's BAS.

effect on kWh schedules will probably be too small to show up in ERCOT/QSE/REP settlement accounting.

The market database 55 contains historical ISO market and operations data, from the APX Market Database 56, current BES and RRS bid and award information (in one implementation, to be adopted from others' actual winning bids), and a record of ancillary service bids, awards, and deployments and their associated parameters. With regard to historical ISO market and operations data, this data would contain day-ahead and RT hourly energy prices (e.g., last 30 days, current season, same season from a year earlier), and BES and RRS market price history (same periods as above). The latter data is needed to develop bids in the BES/RRS Bid Generator 120. In one implementation, the Bid Generator 120 will simply adopt others' actual winning bids, so this historical data will not be needed.

| Description | Retrieval frequency (minutes) |
|---|---|
| IDR kWh | 1 min for Houston buildings participating in BES and RRS real-time ISO markets<br>15 minute for Chicago and Houston load shifting strategies |
| Temperature, return air, every $3^{rd}$ floor, EWNS | 15 minute |
| Humidity, sampled | 15 minute or less frequently? |
| Chiller trend (amp, load) | 5-15 minute (shorter interval required only during periods that buildings are participating in ISO programs requiring real-time response) |
| AHU trend (amp, load, SAT) | 5-15 minute (as above) |
| Pump trend (amp, load) | 5-15 minute (as above) |
| Occupancy schedule | Daily |
| Major equipment status | Event driven |
| Confirmation that ECI communications have been received, that ISO deployment signals have been acted on. | Event driven |

Electric System Markets and Operations Interface 50

The electric system markets and operations interface 50 comprises the REP/QSE interface 53, the market database 55 (which derives ISO market and operations data, both current and historical, from the APX market database 56), the REP Database 52, and the weather database 51.

In regard to the REP/QSE Interface 53, ECI has two alternatives: a standard ECI-specified interface or several REP-specified interfaces. The interface will transfer expected day-ahead building/portfolio load schedule to ECI and then transfer ECI-modified schedule back to REP, transfer REP price signals, if any, to ECI, and provide acknowledgments. In one implementation, this interface will be a simple, custom-designed interface designed to accommodate participation of a specific office.

The QSE Interface 54 will be used for ancillary service market participation. This interface 54 will send ancillary service bids to a QSE to be forwarded to the ISO 80, receive ancillary service awards, and receive ISO deployment signals. In one implementation, ECI will test the ability of a commercial building portfolio to reliably provide ancillary services to ERCOT. This means that ECI need not send/receive actual BES and RRS bids/awards. For example, ECI may adopt others' actual winning bids, and then deploy as if ECI bids/awards. Such operation will far simplify this QSE interface 54, putting the emphasis on deployment of the building portfolio. Because of the relatively small magnitude of kW deployed from a 15-20 building portfolio, the resulting The REP database 52 contains historical and current building/portfolio baseline load schedules, as provided by the REP, and historical and current building/portfolio adjusted load schedules, as sent to the REP.

The weather database 51 contains historical weather data (available from National Climatology Center), such as hourly temperature and humidity (to match the same periods for which hourly interval meter data is available and stored in the building database 66) and daily HDD and CDD data (same periods as above), as well as a 48 hour forecast of temperature and humidity, by hour (available by internet feed from NWS).

In one implementation, an integrated design of ECI and APX systems is performed to minimize development expense until better specification is available and to better explore mutual, long-term development benefits including shared resources (programming, NOC, etc.), development of APX scheduling software, to accommodate customer participation in ISO markets development, setting the standard for QSE and building interface, facilitating QSE value-added services, etc., national roll-out of Energy Automation using APX systems (for example, anticipate and accommodate PJM programs similar to ERCOT by end of year), and a role for Fulcrum. Additional issues can be addressed in the implementation. For example, if an REP is its own QSE, will confidential ECI bid/award data be available to the affiliated REP or a potential ECI competitor? If a QSE is not an REP but otherwise performs commercial services in the market, will confidential ECI bid/award data be compromised? For example, if the QSE affiliate is bidding into the same market as ECI, will it view ECI bids and routinely undercut ECI by 1%? Another issue that can be addressed is to decide whether modified schedules provided directly to a scheduling entity or instead provided to the supplier for submission to its scheduling entity? In Texas, this may be a mute point since many REP's are their own QSE.

Protocols

EnergyConnect's building control and portfolio optimization software strives to maximize portfolio benefits (revenue increases, expense reductions, risk management) while maintaining building comfort. Protocols, in turn, provide the basis for allocating benefits and risks within a building portfolio (according to participation in EnergyConnect products and services) and among market participants (ISO, utility, BAS, ESP, power marketer, and EnergyConnect). Protocols serve several purposes. First, they must produce prices that incent customer, ESP, and utility participation. EnergyConnect programs will develop significant dollar margins, so both attractive pricing and attractive EnergyConnect profit margins are achievable. Second, protocols will influence whether and how competitors enter and share the expense of market development. Third, protocols will seek recognition and capture of the indirect benefits of EnergyConnect programs. As EnergyConnect achieves scale in each market, customers, utilities, and ESPs will realize significant indirect benefits. For example, when energy price volatility is mitigated by EnergyConnect programs, risk and risk management expense will diminish for all market participants. Fourth, protocols will codify direction and timing of the flow of funds among parties. This will dictate EnergyConnect's credit risk exposure and working capital requirements. The protocols will also codify the financial risks borne by each party.

One can confirm designs and test alternative prototype protocols for allocating program benefits and risks. Allocation of benefits and risks takes into consideration: commercial building availability, building performance capability, actual performance (all as recorded by the scorecard software), and incremental contribution to portfolio benefits (as determined by the portfolio optimization software). Protocols tasks include: specifying protocols (and in form that can be translated into accounting) and defining associated information requirements, especially as they affect hardware/software/communications development (for example, commercial building energy bill monitoring and savings analysis, commercial building performance measurement and verification, and revenue disbursement and netting of payments).

Communications, Signal Management, and Building/BAS Interface 68

The communications, signal management, and building/BAS Interface 68 is software/hardware that handles data transfer among EnergyConnect, building owners and their BAS systems, scheduling coordinators, energy service providers and collects data from ISOs, the National Weather Service, and utilities.

Products and Services

The EnergyConnect platform enables powerful products and services. The following "initial" products are targeted to benefit commercial buildings by reducing energy expense and by reducing the burden on energy suppliers and energy delivery systems. All of these products and more can be provided today under already established rules in Texas. Many of these products can be provided today in the New England, New York, Mid-Atlantic, and Midwest markets. As these markets continue to develop, so will EnergyConnect products and services. EnergyConnect products include capturing energy margins, reduce system or local coincident peak load, reduce shaping and imbalance energy expense, reduce risk management expense, reduce ancillary services expense, arbitrage gas/electric prices, and basic blocking and tackling. Reduced energy expenses shows up immediately in property market values. The value to the building owner of improved operating profit is typically ten to one, e.g., adding $10,000 to net operating profit increases the value of a property by $100,000. The value of this incentive to building owners depends on widely varying tenant arrangements. These products will now be described in more detail.

Capturing Energy Margins

Capturing energy margins continuously and optimally shifts use to shoulder and off-peak periods based on day ahead prices, continuously and optimally shifts use to lower-priced hours dynamically during each day, or, if market prices are not available, continuously and optimally shifts use to minimize costs under utility tariff. In other words, capturing energy margins continuously, optimally, and automatically shifts time-of-use to lower-priced hours. There are two ways to be paid for this product: responding to utility tariff (provides direct savings on the customer power bill) and responding to the ISO provides payment for service. If the utility bill is reduced, then a customer fee or share of savings is paid to EnergyConnect. In the case of payments from the ISO, EnergyConnect receives the entire amount and shares the appropriate portion with the building customer.

Figure 5:
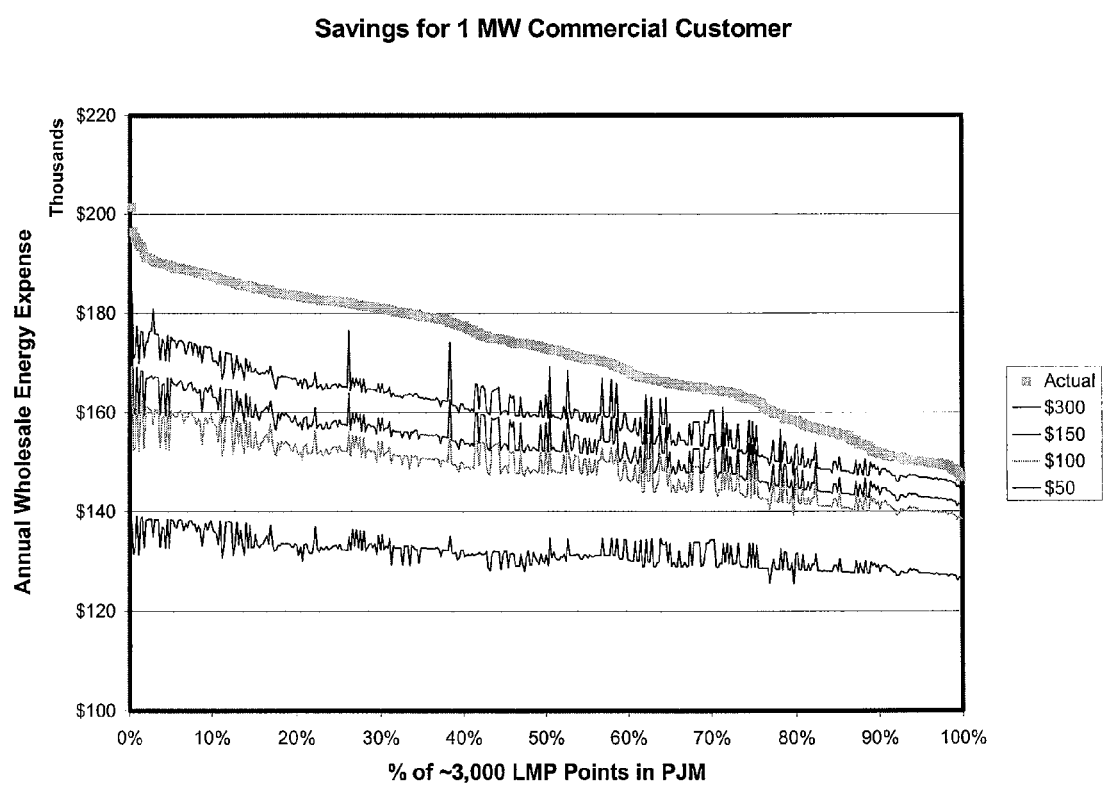
FIG. 5 is a graph of savings for a 1 MW commercial customer.
Figure 6:
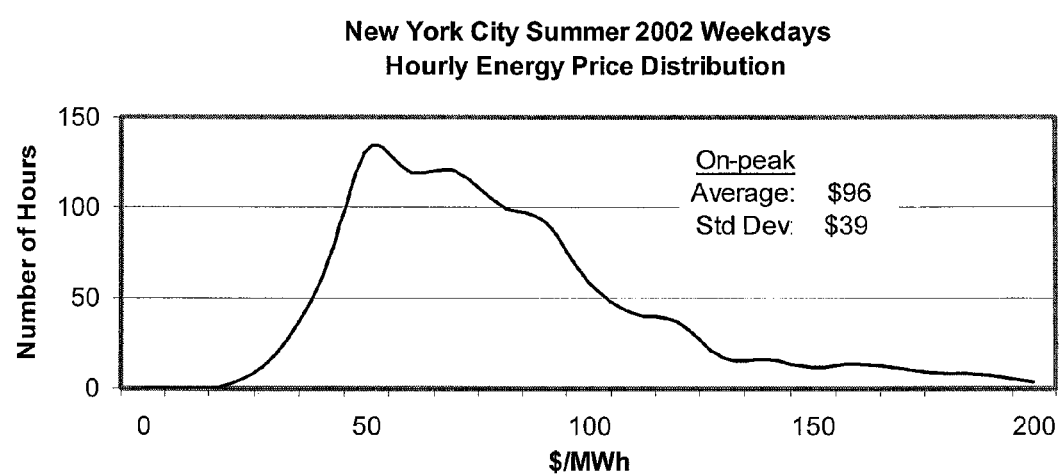
FIG. 6 is a graph of hourly energy price distribution in New York City Summer 2002 weekdays.

As the PJM analysis in FIG. 5 indicates, a market program that clips just the highest prices (that is, that shifts individual customer's energy use away from a few high-priced hours) can significantly reduce customers' energy bills. The top line in the figure reflects actual wholesale energy expense to serve a 1 MW customer at each of the ~3,000 PJM LMP points (sorted in descending order). Each succeeding line reflects the effect of clipping prices at $300, $150, $100, and $50. EnergyConnect's target markets and customers will benefit especially, because higher and more volatile prices are characteristic of large metropolitan areas. Shifting an individual customer's energy use away from high-priced or high value hours is not the onerous task implied by most utility tariffs. In contrast to the static pricing historically used in such tariffs, power supply and delivery economics produce high and volatile energy costs and prices. Nonetheless, a price clipping strategy would involve relatively few hours (see FIG. 6).

Figure 7:
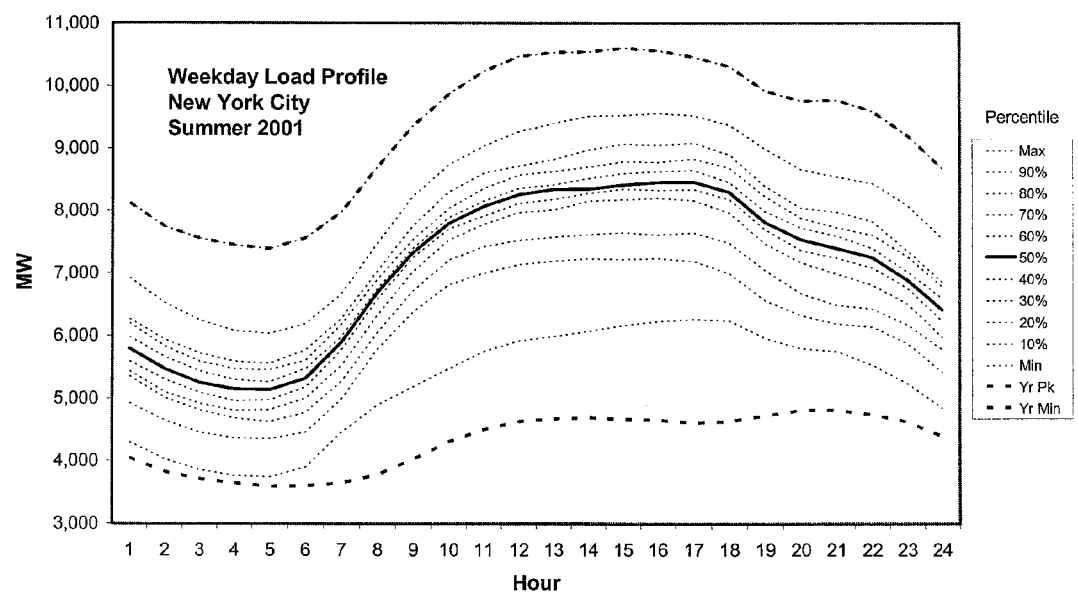
FIG. 7 is a graph of weekday load profile for New York City Summer 2001.

Likewise, demand control has disproportionate value on just a few peak days. As FIG. 7 indicates, customer loads vary across a wide range, and so electric supply and delivery systems are burdened on relatively few peak summer days.

Figure 8:
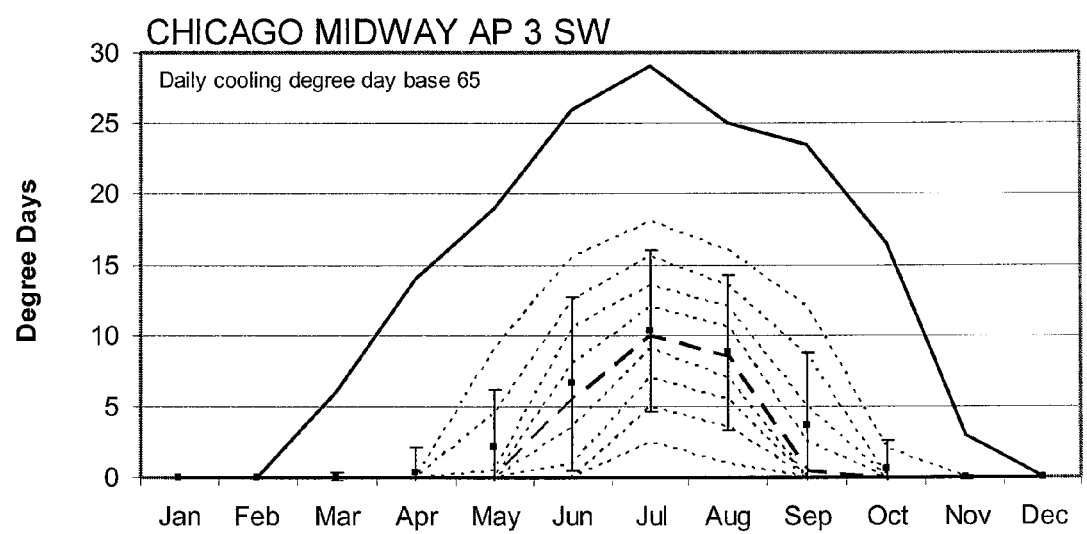
FIG. 8 is a graph of degree days versus month for Chicago Midway.

Weather-driven load and market price variability differs from city to city. For example, Chicago and Dallas experience widely varying summer weather (see FIG. 8 with respect to Chicago); San Diego and San Francisco do not.

Figure 9:
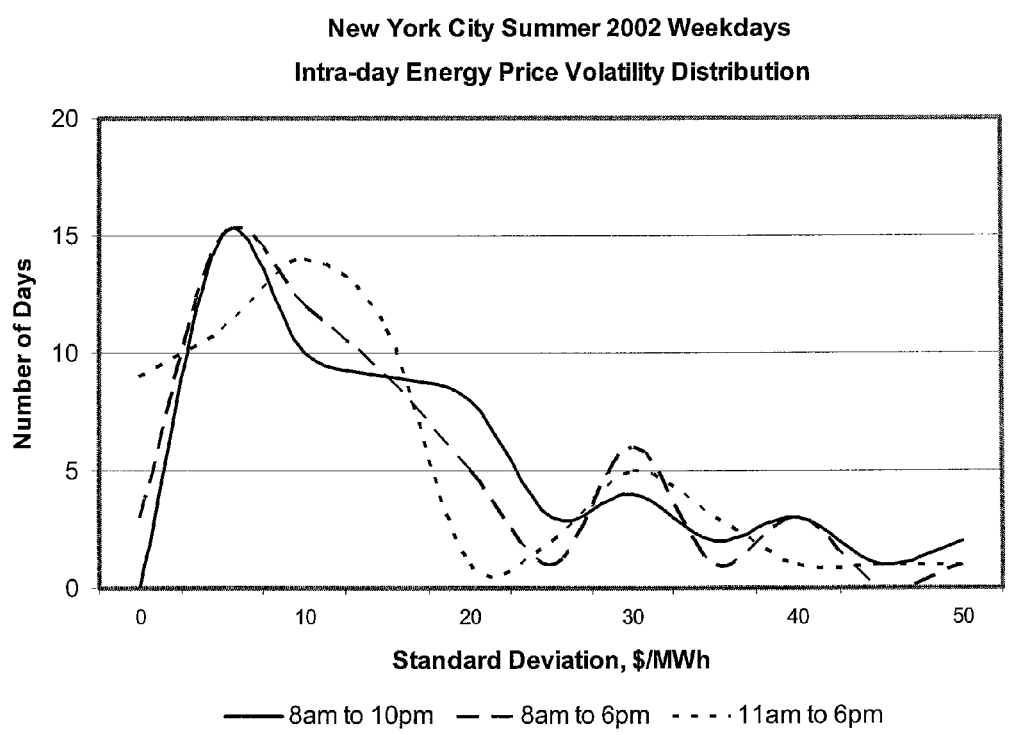
FIG. 9 is a graph of intra-day energy price volatility distribution for New York City Summer 2002 weekdays.

As an important corollary, if permitted the freedom to shift hour-to-hour energy use every day, absent the strictures of an every day demand charge, a commercial building can create significant economies for the supply and delivery system. Allowing flexible energy use on other than the few peak days would not tax either the generation or delivery systems. FIG. 9 shows that volatile energy costs and prices occur intra-day, that is, from hour-to-hour within an on-peak window. This means that commercial buildings need only shift cooling loads hour-to-hour in order to create significant economies.

Figure 11:
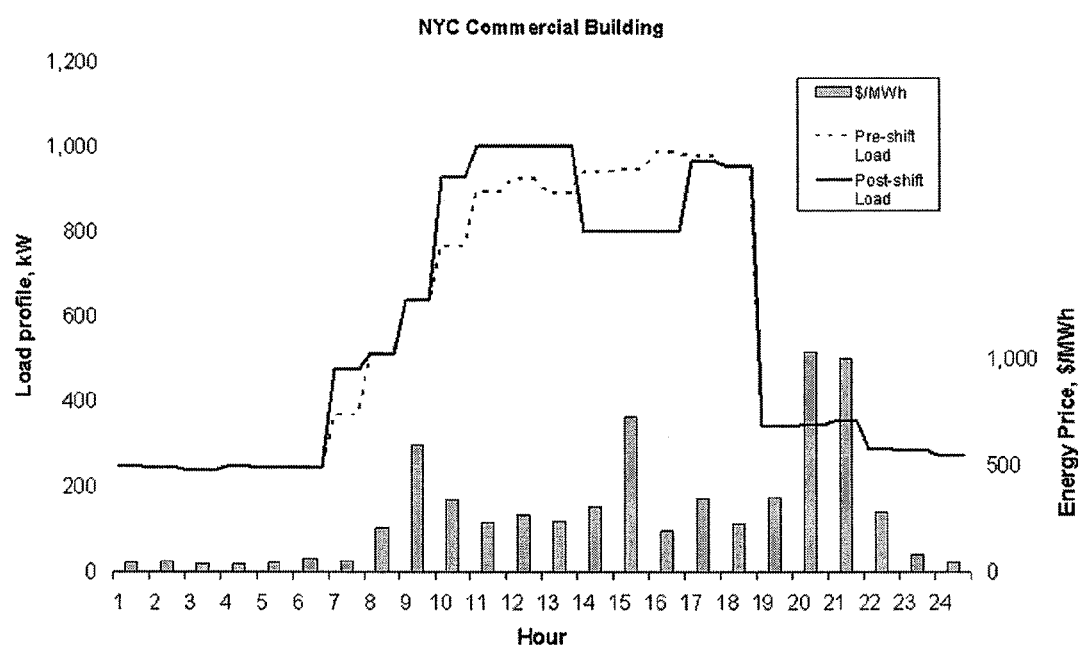
FIG. 11 is a graph of load profile versus hour for a NYC commercial building.

The table in FIG. 10 and graph in FIG. 11 summarize a simulation performed on a 1 MW commercial office building over three summer months. The building has a state-of-the-art BAS system and is rigorously controlled to minimize the electric tariff bill each month. Tariff-based operation produced a summer bill of $154,000. Under the simulation, the BAS system instead rigorously controlled the building to minimize the economic cost of supply and delivery. Relative to the tariff-based operation, economic operation reduced the cost of supply and delivery by 20-40% over a wide range of assumptions. In one simulation, cost was reduced $50,000—roughly ⅓$^{rd}$ of the tariff bill. This same simulation increased the tariff bill by over $15,000. The increase is largely attributable to increased demand and demand charges on non-peak days and hours, i.e. days and hours that did not tax either the generation or delivery systems. The table in FIG. 10 shows the cost reductions that produced the $50,000 savings. The graph in FIG. 11 provides an example of summer weekday electric prices and a building pre-cooling strategy carried out in anticipation of such prices.

This product can be described as continuously and optimally shifting building load to lower-priced hours. Initially, EnergyConnect will target very large cities that have (1) locational marginal prices (LMP) and deregulated retail markets for electricity or (2) existing time-of-use or real-time-pricing utility tariffs. EnergyConnect will then migrate this product to other large cities. Compensation for providing this service may come from a share of customers' energy savings, as reflected monthly in their utility or energy service provider (ESP) bill. There are several market development issues. First, there is a need to amend utility tariffs so that demand charges discriminate between coincident and non-coincident peak use. That is, demand charges need not constrain hourly price-response actions except during peak hours. Second, ISO's need to extend operation of real-time demand-response programs into a lower range of prices. EnergyConnect customers will capture their most significant savings through volume in the frequent $50-100/MWh hours, not in the increasingly rare $100-1000/MWh hours. Third, EC needs to gain recognition of real and reactive loss profiles by hour, day-type, and season. $I^2r$ means that distribution losses are much greater weekday afternoons in the summer when prices are highest. Reactive power losses also typically peak in those same hours.

Reducing System or Local Coincident Peak Load

To reduce system or local coincident peak load, individual building actions in real time reduce system or local loads at times when increasing coincident load would cause additional costs to be incurred by energy supply or delivery entities. Certainty and permanence of reductions are created through portfolios of customers that can more effectively assure reductions on year ahead or day ahead basis and dynamically during each day. Reducing system coincident peak load involves responding as a portfolio to utility and ISO demand reduction programs. This is significantly more valuable to suppliers than programs targeted at individual customer demand reductions. Payment for service varies by program and has maximum value in EnergyConnect target markets. EnergyConnect receives payment for service and distributes a portion of the proceeds to the building customer.

This product can be described as curtailing demand in coincident peak load periods; in its most basic form, control and shift demand to mitigate utility tariff charges. With some aggregation of commercial building load, curtail or shift peak demand into off-peak windows based on signals from ISO's and utilities. Examples of practical early applications include the CA Demand Reserve Partnership Program and ISO demand response programs such as the NYISO's ICAP Special Case Resources (SCR), Emergency Demand Response Program (EDRP) or Day-Ahead Demand Response Program (DADRP). Emerging programs, like the CA Demand Reserve Partnership Program, include many features conducive to commercial load participation. These features include, for example, aggregation of building loads (contrasts with historical utility programs requiring commitment from individual building accounts. The diversity of an aggregated portfolio enables commitment that an individual building cannot make.), variable and changeable month by month commitment level (allows commitment to vary seasonally to reflect changing building energy uses and use levels), and ad hoc participation (for lesser compensation, building loads can offer curtailment on an ad hoc voluntary basis without the burden of an every day obligation).

NYISO's SCR pays retail electricity customers to provide their load reduction capability for a specified contract period. Program participants receive payments in advance for an agreement to curtail usage during times when the electric grid could be in jeopardy. Based upon system condition forecasts, participants are notified to curtail this claimed "capacity", either through the use of on-site generation and/or reducing electricity consumption to a firm power level. EDRP allows participants to be paid for reducing their energy consumption upon notice from the NYISO that an operating reserves deficiency or major emergency exists. The program is open to interruptible loads or local "behind-the-fence" generation greater than or equal to 100 kW per zone. Loads register for the program through Curtailment Service Providers (CSPs); when called upon, CSPs will be paid for verified load reduction at the rate of $500/MWhr or real-time zonal locational-based marginal price (LBMP), whichever is greater. DADRP allows loads, through their load serving entity, to bid load reduction into the day-ahead energy market. Load reduction bids are evaluated along with generation supplier bids as part of the NYISO's Security Constrained Unit Commitment (SCUC) program. If scheduled through SCUC, loads are paid day-ahead LBMP for the scheduled demand reduction, and are also paid an incentive (at the day-ahead LBMP) for any additional load reduction provided in real time.

With aggregation and some greater sophistication, EnergyConnect can sell capacity, e.g. as part of the NYISO ICAP Special Case Resource Program. Participation in utility and ISO programs depends on commercial load aggregation. These programs are designed for customers able to shed significant MW for the duration of the super peak period, e.g. 1-5 MW for 3-6 consecutive hours, typically weekday afternoons in the summer. Such performance is typically not possible out of a single commercial building, but could be extracted from a 25 MW portfolio of buildings acting in coordination.

Compensation for reducing peak load may come from i) share of customers' utility tariff demand savings or ESP demand charge savings, ii) utility interruptible program payments, iii) ISO demand-response program payments, and iv) capacity sales within ISO-sponsored markets. One market development issue is that utility interruptible programs provide only a small share of benefits to participating customers.

Reducing Shaping and Imbalance Energy Expense

Reducing shaping and imbalance energy expense shapes customer load to approximate more liquid wholesale energy blocks and self-mitigates weather-driven volume volatility. Less reliance on illiquid hourly energy markets will reduce energy suppliers' energy and risk management expense.

Figure 12:
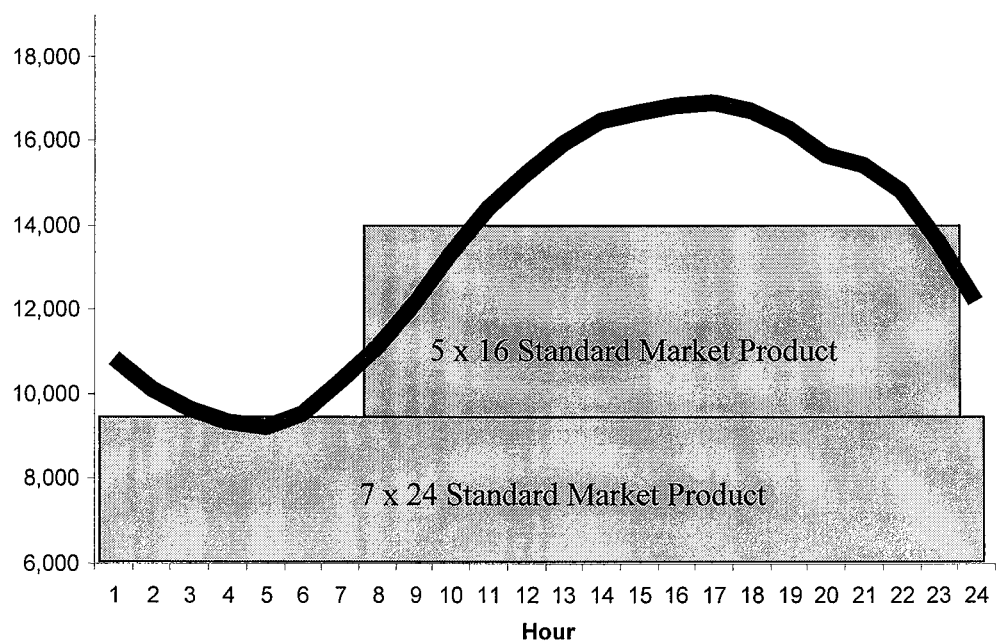
FIG. 12 is a graph of load profile versus hour.
Figure 13:
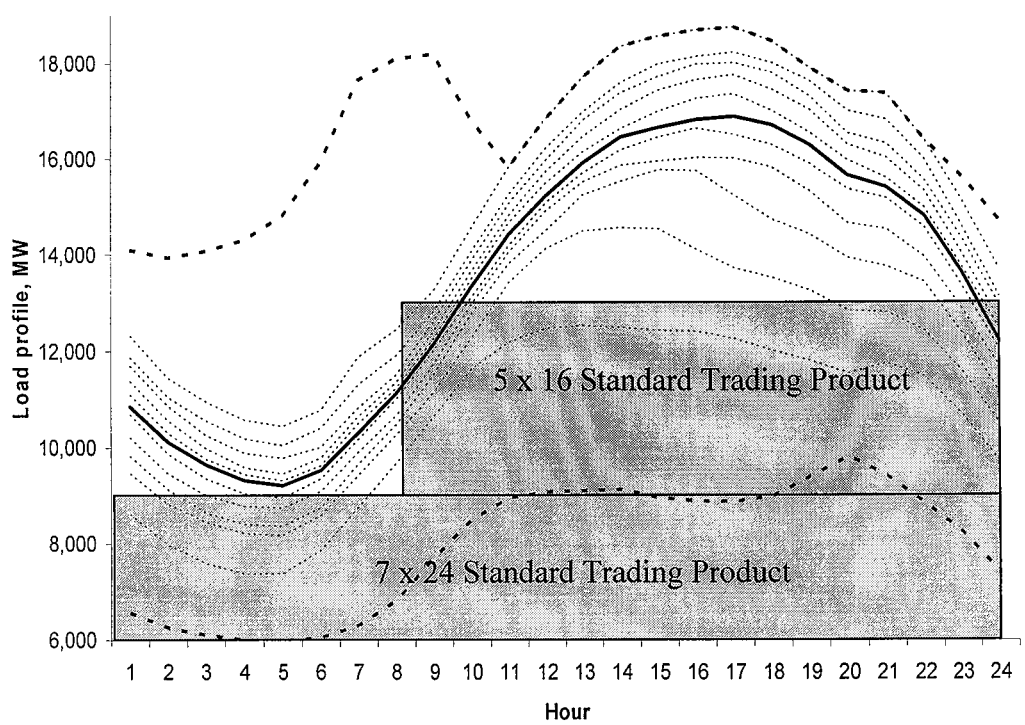
FIG. 13 is another graph of load profile versus hour.

This product can be described as follows. EnergyConnect will immediately provide a building portfolio with the ability 1) to reduce the utility or energy service provider (ESP) expense and risk of buying shaped products from the market and 2) to self-manage volume risk and imbalance price risk. This product complements (does not preclude) other EC products and services. For example, EC would initially commit its portfolio to a shape that more closely approximates standard market products. The energy supplier would then contract on a forward basis, relying more so on these less expensive standard products. Second, in actual operation, EnergyConnect would then shift load in response to hourly prices, creating additional value with no downside risk. See FIGS. 12 and 13 for graphs of load profile versus hour. FIG. 12 shows that it is expensive to shape energy supply to customer loads. Less liquid hourly products are pricey and risky. FIG. 13 shows that it is even more expensive to adjust "shape" purchases weekly, daily, and hourly to fit dynamic customer loads. Default imbalance energy is especially pricey and risky. Compensation for providing this service may come from a share of customers' energy and risk management savings. ESPs will facilitate this product and so will also share in the savings.

Regarding market development issues, utilities with large, incumbent customer portfolios can shape supply and manage imbalance more easily because of the diversity of customers because regional resources are more or less matched to the utility's load shape and because they typically own or control significant regional resources. As a corollary, ESP customer portfolios have less diversity (more volatility) and are odder-shaped. Moreover, ESPs typically have to buy shaped products at the margin from generation-controlling utilities. This means there will likely be strong initial interest in this product from ESPs, especially those without their own regional generation portfolios and without large regional customer portfolios. Even a modest EnergyConnect building portfolio can provide smaller ESP's with the benefit of diversity. A larger portfolio may have the flexibility to sell shaping/imbalance products to the energy market.

Reducing Risk Management Expense

Regarding reducing risk management expense, the revenues derived from Energy Automation products and services are positively correlated with customers' volatile energy expenses (both gas and electric), and thus hedge customers' energy expense risk. Moreover, expectation of damped energy prices and associated volatility will reduce long-term risk management expense. Reducing short-term risk management expense shapes customer load around more liquid wholesale energy blocks and self-manage weather-driven volume volatility. Less reliance on illiquid hourly energy markets and less exposure to volatile imbalance energy will reduce short-term risk premiums. This service to suppliers and ISOs competes directly with the price currently paid. The cost to supply this service is a small fraction of current price. In most applications EnergyConnect is paid directly by the supplier, but in some cases with large building owners and managers the contract between supplier and building may reflect the service, and the building customer will pay EnergyConnect. Regarding reducing long-term risk management expense, expectation of damped energy prices and associated volatility will reduce long-term risk management expense. This product differs from short-term risk not only in time frame, but the cost to supply is an even smaller fraction of current price.

Risk management is a significant byproduct of Energy Automation products and services. In high price/high load months or seasons, more frequent and more valuable opportunities exist for price-responsive load shifting, peak demand reduction, and shaping and imbalance energy savings. This means that the associated Energy Automation revenue (or savings) is positively correlated with a customer's monthly or seasonal energy expense, and so provides a natural hedge. This natural hedge is also intrinsic to other Energy Automation products and services. Eventually, the more liquid energy markets created by Energy Automation will damp expected prices and price volatility and thereby reduce the associated risk premiums incurred by suppliers (and passed on to customers).

Figure 14:
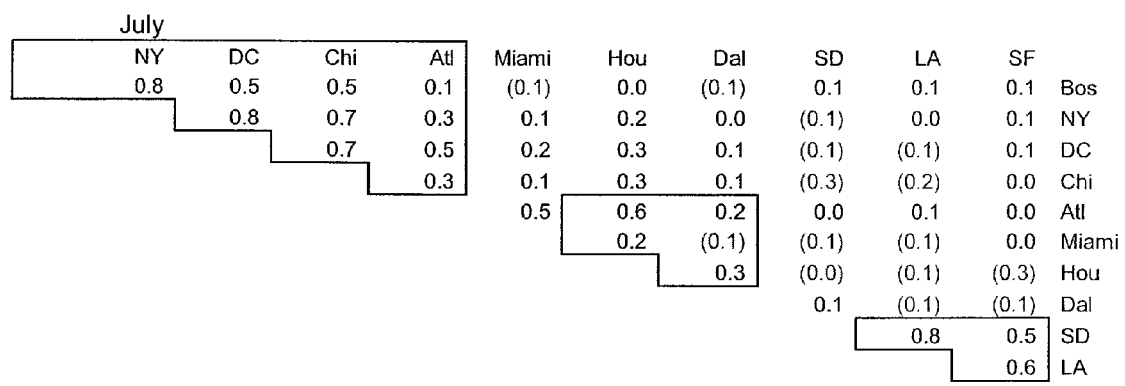
FIG. 14 is a table showing metropolitan city cooling degree day correlation.

To the extent energy price volatility is driven by natural gas prices, Energy Automation provides an additional tool for building owners and energy service providers to hedge their natural gas exposure. To the extent energy price volatility is weather-driven, Energy Automation provides national building owners and national energy service providers an additional tool for managing energy price risk on a regional portfolio basis. This results from the weather correlation among cities within broad regions of the country. FIG. 14 is a table showing metropolitan city cooling degree day correlation.

This product can be described as follows. As a byproduct, customers and suppliers will derive significant financial risk management benefits from Energy Automation products and services. To the extent not needed by any one customer, these benefits are transferable to other building customers within the portfolio.

Reducing Ancillary Services Expense

Reducing ancillary services expense reduces load regulation burden and spinning-reserve burden on the electric system. These products will initially be sold to ISOs at prices established for delivery of similar services by generators. EnergyConnect will be paid directly by the ISO.

Reducing load regulation expense product description: This involves reducing or eliminating load regulation burden on the electric system. Control area operators balance generation with ever changing electric loads. For example, NYISO sends dispatch "basepoint" signals to generators every 5 minutes. Such signals cause generation to follow the daily/hourly load profile. NYISO also sends regulation or AGC signals to "regulating" generators every 6 seconds. Such signals cause generation to follow minute/second load volatility. This finer control is needed to meet NERC/NYISO control area performance standards for load/generation balance and for frequency control. To perform this finer control, NYISO typically requires flexible regulating capacity equal to 1% of the customer load. If a customer load is not volatile, then it imposes no regulation burden on the control area. If customer load volatility can be controlled to vary opposite the control area load, then that customer is providing a regulation benefit to the control area. In advance of ISO recognition of customer-provided regulation service, EnergyConnect will at least seek relief from regulation charges. This will provide some savings while demonstrating that customer loads can reliably and profitably participate in control area regulation services markets. Compensation for providing this service may come from sharing in avoided regulation charge.

One market development issue is gaining ISO recognition of reduced burden on ISO operation. This is a simple, first step toward setting up commercial customers as suppliers of regulation services.

Arbitraging Gas/Electric Prices

By arbitraging gas/electric prices, current very high gas prices overcome electric inefficiencies in markets and in hours that coal-based generation is at the margin. This product can be described as follows: switch HVAC systems between electric and gas supply in order to arbitrage gas/electric prices. At night, the gas/electric price spread may overcome the inherent inefficiency of electric supply and merit switching to electric heating. Switching night-time heating load will make sense when coal or nuclear generation is at the margin setting electric market prices. There is a corresponding opportunity to switch electric heating customers to natural gas during on-peak periods when electric prices are high. For example, electric prices typically spike during the early morning load pickup when all the residential setback thermostats trigger. Compensation for providing this service may come from sharing of arbitrage savings. Regarding market development issues, electric heating at night, when performed on a market scale, would take significant pressure off the price of natural gas, a premium fuel. The reduced coal plant cycling would mitigate added environmental emissions. To implement this service, commercial buildings will typically have to add an electric heat exchanger to their existing heating systems, and ESPs will have to augment their gas scheduling operations to accommodate short-term switching. In the current climate of historically high and volatile gas prices, ESPs will appreciate the financial risk management value of this option.

Basic Blocking and Tackling

Basic blocking and tackling involves rigorous application of state-of-the-art building automation systems to create additional energy savings for many customers, as much as 10%, and sets the stage for Enterprise Energy Automation. Preparatory to providing initial Energy Automation products and services, EnergyConnect provides services to assure that customer facilities are doing the basic blocking and tackling of energy management. They include "tuning" HVAC and BAS equipment to meet design performance, installing "enterprise" energy reporting software, upgrading to state-of-the-art BAS, as necessary to execute Energy Automation strategies and including project finance if preferred, and controlling energy use against utility tariffs.

These basic services provide several benefits. First, they create additional energy savings for many customers, as much as 10%-alone usually sufficient to justify BAS upgrade. Second, they enable an enterprise energy solution for national customers, whose facilities exist in a variety of regulated/deregulated markets. Finally, they provide with insight into customers' energy equipment and use that is invaluable to executing Energy Automation. All of these products and services increase building value—by reducing energy expenses. Value to the building owner is typically ten to one, e.g. adding a sustainable $10,000 to net operating profit increases the value of the building by $100,000.

Compensation for this service may come from a share of the energy cost savings (from enhanced energy management system performance) as reflected in the customers' monthly utility or energy service provider (ESP) bills. This will be a monthly fee or percentage of savings. In addition, a fee will be charged to the customers for engineering, project management and program interface if the BAS is upgraded. Fee based relationships will be developed between EnergyConnect and the various suppliers of these upgrade services (BAS manufacturers and installing contractors).

Regarding market development issues, these services are more applicable to high cost energy markets (electricity and gas) and to markets where tariffs support and reward buildings able to control load hourly (time-of-use rates, peak, super-peak, etc.).

Additional Products and Services

Additional products and services can be used to provide expansion and greater profit margins. EnergyConnect can deliver joint products and services extracted from the building portfolio. Such products and services include reducing locational marginal price, reducing capacity reserve margin requirements and expense, selling ancillary services to the market, reducing capital investment for distribution system growth, reducing distribution system operating expense, selling shaping and imbalance services, and controlling distributed generation.

Reducing Locational Marginal Price (LMP)

Figure 15:
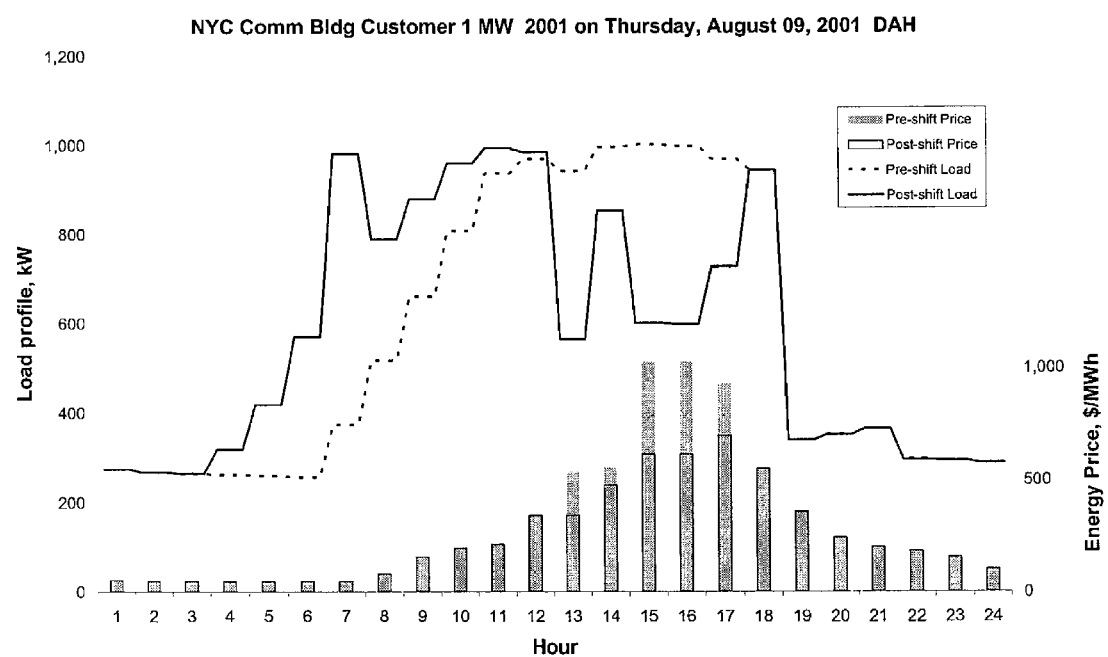
FIG. 15 is a graph of load profile versus hour for a NYC Comm building customer.

The reducing locational marginal price (LMP) product can be described as shifting energy use to lower-priced hours in local, transmission constrained market, typically a large metropolitan city, e.g. New York, Chicago, San Francisco. Additional opportunity during less frequent, system-wide price spikes. See FIG. 15, which is a graph of load profile versus hour for a NYC Comm building customer. Compensation for providing this service may come from negotiated share of estimated savings, e.g. a fee from BOMA members that recognizes value created by operation of the Energy Automation System.

There are several market development issues. These include: i) customer volume needed for material effect and ii) eventually, this program will damp prices and price volatility for all customers, so high prices will lose visibility and customers therefore will no longer see a benchmark against which to measure savings.

Reducing Capacity Reserve Margin Requirements and Expense

The product description for reducing capacity reserve margin requirements and expense is that building groups can internally provide many of the services and manage many of the risks that capacity reserve margins are intended to cover. Examples include weather-related load volatility, load forecast error, and spinning/regulating reserves.

Reduced operating reserves provide an intriguing example. Operating reserves include capacity to provide regulation, spinning, and non-synchronous operating reserves. As an example, for discussion, assume spinning reserve equal to 3% of load are required on a peak day (i.e. 1,000 MW for largest contingency divided by a 33,000 MW peak load). This means that at least 3% of a 15% installed capacity reserve margin is dictated by the need to provide spinning reserves from generating resources during peak load conditions. One possibility is that a commercial load portfolio would provide spinning reserve MW's on summer weekdays equal to 3% of its load and have its reserve margin requirement dropped to 12%. The second possibility is that the same portfolio would provide spinning reserve MW's disproportionate to its size, e.g. >3%. In this case, the portfolio's reserve margin requirement could drop even further, MW for MW. This is an example, and technical adjustments both up and down can be made.

Providing Ancillary Services to Market

In Texas, commercial buildings are now allowed to participate in ancillary service markets. The specific technical requirements have been articulated and leeway has been given to scheduling entities regarding the nature of contractual arrangements. This provides the opportunity to prove out the ability of commercial building loads to participate profitably in such markets. Other parts of the country will follow.

In Texas, "Loads acting as resources" can provide ancillary services based on the load's available technology, as follows. (1) Responsive Reserve: requires that an Under Frequency Relay (UFR) be installed that opens the load feeder breaker on automatic detection of an under frequency condition. These loads are also required to be manually interrupted within a 10 minute notice. The load, breaker status, and relay status must have real-time telemetry to ERCOT (through the QSE) installed. Loads qualified for the Responsive Reserve market are also automatically qualified for the Non-Spin market, Replacement and Balancing Energy Market. (2) Non-Spin Reserve: requires that interruptible loads be manually interrupted (e.g., opening a circuit breaker) within 30 minutes notice. The load must also have real-time telemetry installed. (3) Regulation Up and Down Service: requires that interruptible loads through automatic controls respond to signals provided by ERCOT to increase and decrease load while meeting rigorous performance monitoring criteria. The load must also have real-time telemetry installed. Loads qualified for Regulation Up and Down service are also qualified to provide Non-Spinning Reserve, Balancing Energy Services, and Replacement Reserves. (ERCOT systems do not yet accommodate loads of this type). (4) Balancing Energy Up: requires that loads be able to respond through manual or automatic operations to interrupt load within 10 minutes. The load must also have real-time telemetry installed. Loads qualifying for Balancing Energy Service are also qualified to provide Replacement service. If an interruptible load has been awarded an ancillary service capacity payment, that load may not be bid into the balancing energy market. (5) Replacement Reserve Service: loads that were planning to be on-line but not providing any other Ancillary Service.

In terms of a product description, providing ancillary services to market provides spinning reserves and load and frequency regulation. Such services can be reliably provided out of a large, diverse building portfolio. Such a portfolio will provide 1) size, e.g. NYISO requires that regulating resources provide at least 5 MW; 2) regulation-capable or variable speed motor loads; and 3) performance reliability. Nimble variable speed motors are much better suited to these services than are cumbersome power plants.

Figure 16:
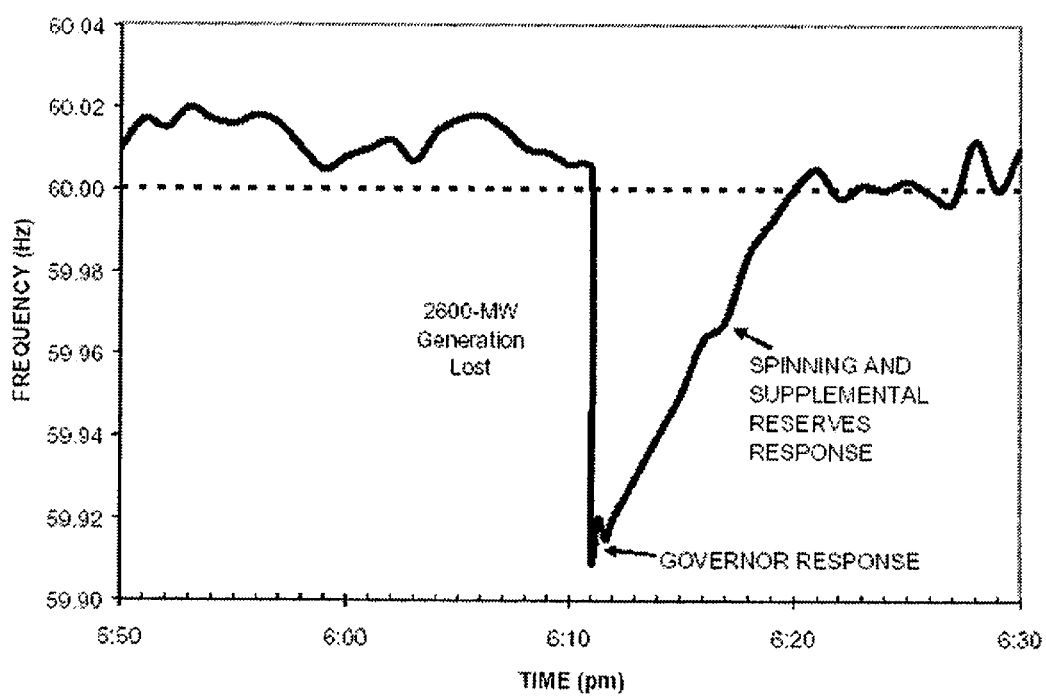
FIG. 16 is a graph showing governor response and contingency reserves successfully restored then generation/load balance after the loss of 2600 MW of generation.
Figure 17:
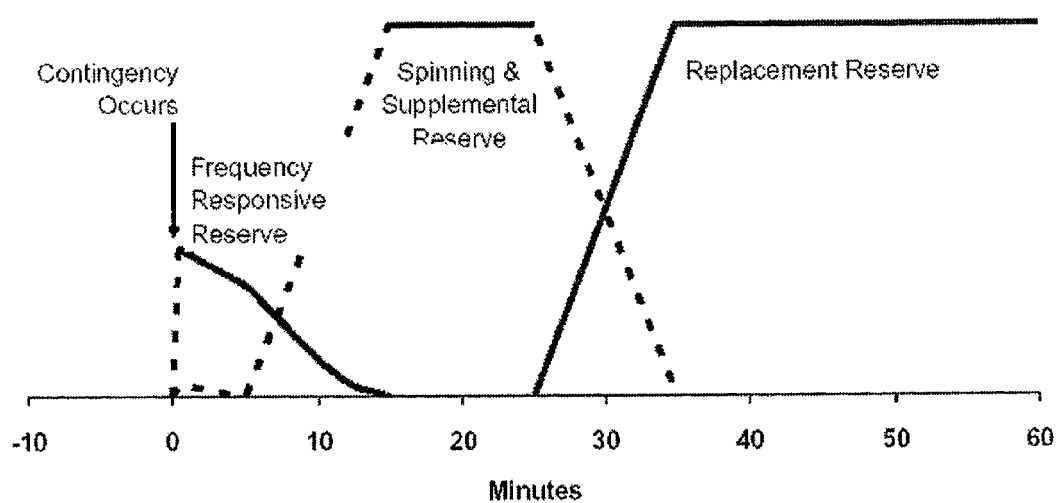
FIG. 17 is a graph showing contingency reserves provide a coordinated response to a sudden loss of supply.

FIG. 16 is a graph showing governor response and contingency reserves successfully restored then generation/load balance after the loss of 2600 MW of generation, and FIG. 17 is a graph showing contingency reserves provide a coordinated response to a sudden loss of supply. The source for these graphs is "Technical Issues Related To Retail-Load Provision Of Ancillary Services, Background Issues Discussion," Brendan Kirby and Eric Hirst, Feb. 10, 2003.

Regulation reserves are called on continuously, e.g. in NYISO to respond to AGC signals transmitted every 6 seconds. A regulating resource is deemed to have performed if it responds within a bandwidth established by the min/max AGC signals sent out over the subsequent 30 seconds. Operation outside this bandwidth results in decreased payments for service.

By contrast, spinning reserves are called infrequently due to random generator outages and other significant ACE excursions. When called on for a generator outage, they fill the breech, e.g. until more permanent operating reserves can be brought on-line, e.g. in 10-30 minutes.

Figure 18:
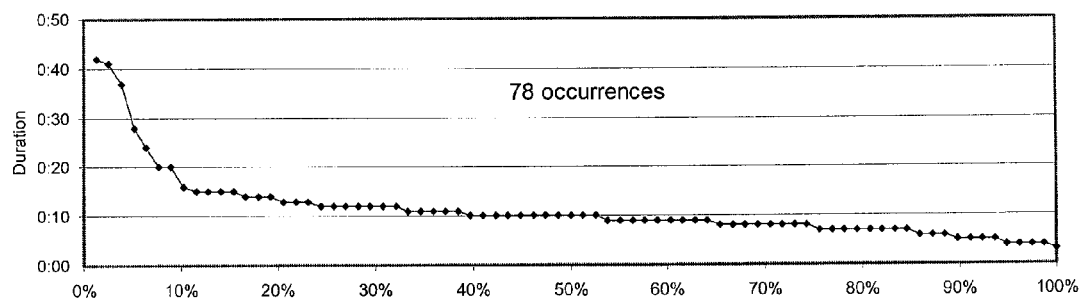
FIG. 18 is a graph showing duration of spinning reserve activation.
Figure 19:
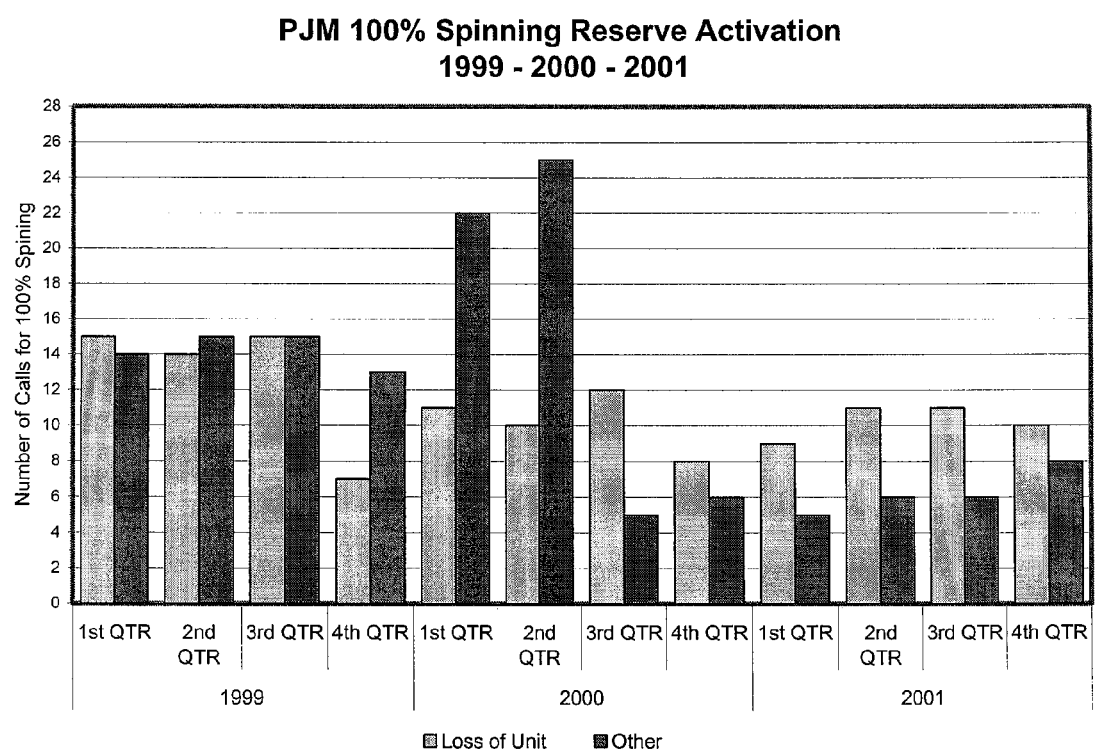
FIG. 19 is a graph of PJM 100% spinning reserve activation.
Figure 20:
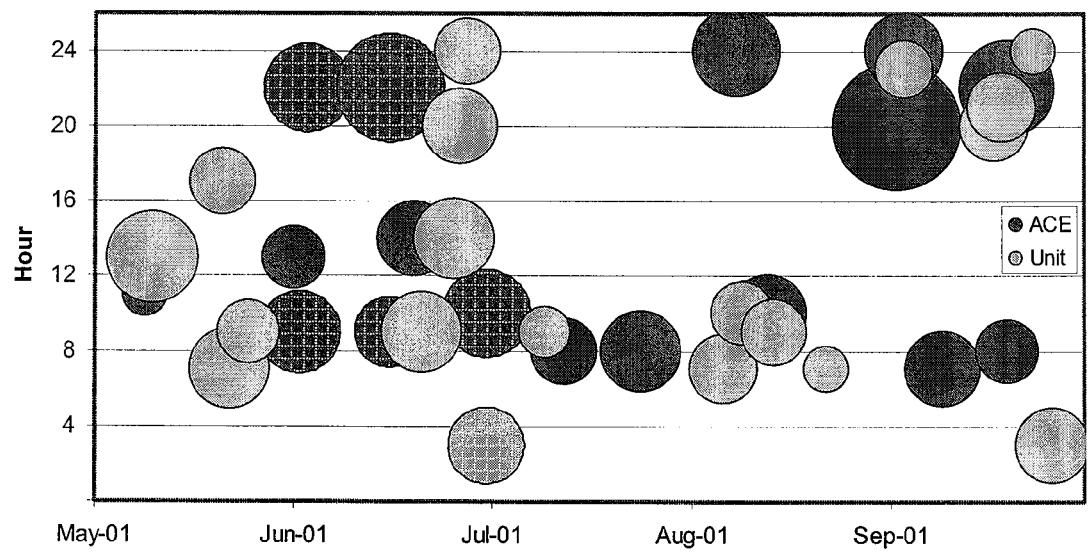
FIG. 20 is a graph of 2001 PJM summer spinning reserve activation.

FIG. 18 is a graph showing duration of spinning reserve activation, FIG. 19 is a graph of PJM 100% spinning reserve activation, and FIG. 20 is a graph of 2001 PJM summer spinning reserve activation. In FIG. 20, the circle size is equal to the duration of spinning reserve call. The solid circles are weekdays, and the patterned circles are weekend. "ACE" means spinning reserve called on to restore ACE, and "unit" means spinning reserve called for generating unit failure.

Figure 21:
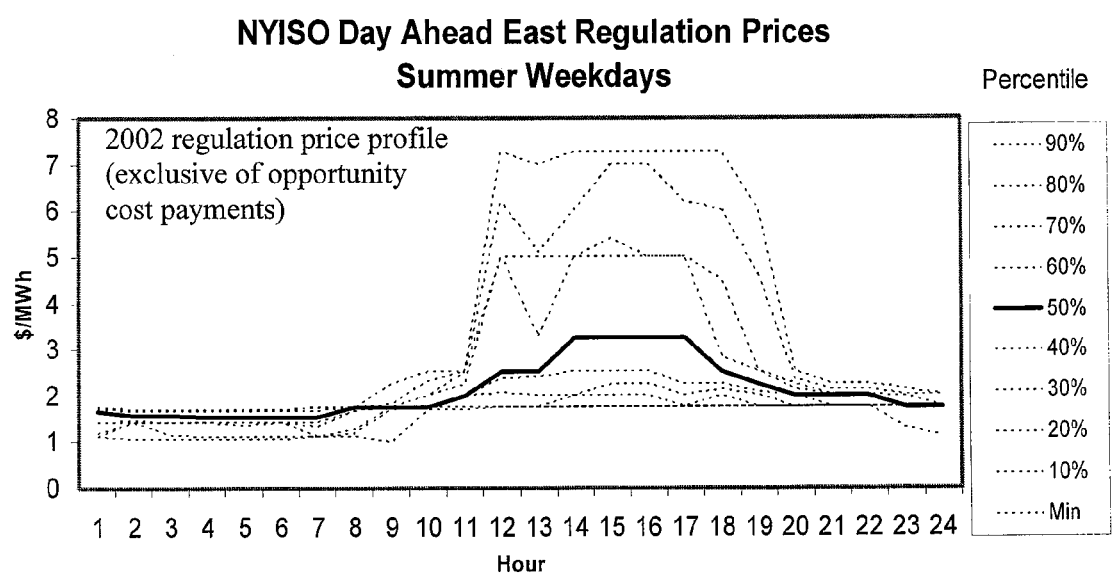
FIG. 21 is a graph of NYISO day ahead east regulation prices on summer weekdays.
Figure 22:
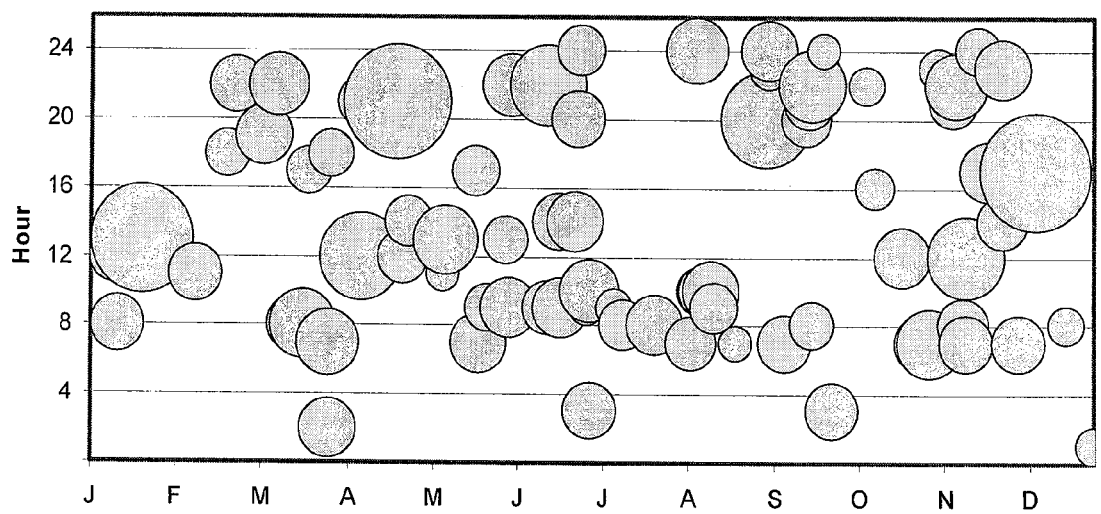
FIG. 22 is a graph of 2001 PJM spinning reserve activation.

Relatively few spinning reserve calls occur during the priciest summer hours, e.g. 11 am to 8 pm weekdays. During these periods, generating units are typically fully loaded and incur a high opportunity cost to provide spinning reserve service. Commercial building loads would aim to compete to provide such services in these hours. Instead, most summer spinning reserve calls occur as generation and load are ramping up early in the day or ramping down in the evening. During these periods, many generating units are backed off and readily available to provide spinning reserve service. Prices are at their lowest. Commercial building loads, e.g. air conditioning, would typically not be available to compete in these periods. These same conclusions generally hold year-round, as shown in the graph of FIGS. 21 and 22.

EnergyConnect revenues come from service revenues, based on spinning reserve market prices and opportunity cost payments currently provided to generators, capacity revenues (i.e. installed capacity is no longer needed in the peak hours of the year to provide spinning reserves that are customer supplied, thus reducing the required installed capacity reserve margins), and energy market price reduction (i.e. the marginal unit setting market prices will now be a lower priced generating unit).

Reducing Capital Investment for Distribution System Growth

The "reducing capital investment for distribution system growth" product can be described as eliminating or deferring capital improvements to distribution system by controlling coincident peak load growth, by reducing load uncertainty, and by responding to distribution system contingencies. A commercial building portfolio—by responding to contingencies or restoring contingency margin—may be able to reduce the number of contingencies that distribution system planners currently consider in order to maintain delivery reliability. This translates into reduced or deferred capital expenditures.

The following table relates to a Consolidated Edison Case Study and is discussed below.

| | Distribution Plant Expenditures | | | |
|---|---|---|---|---|
| Year | Expenditures | Peak MW | $/kW-year | Energy (1000 MWh) |
| 2002 | $422 M | 10,215 | $41 | 33,972 |
| 2001 | $438 M | 10,293 | $43 | 34,190 |
| 2000 | $385 M | 9,379 | $41 | 35,410 |
| 1999 | $422 M | 10,038 | $42 | 35,114 |

Con Ed has distribution assets of $8.5 billion and spends over $400 million (5%) each year for growth/reliability and replacement. The peak growth rate, 1994-2002, has been 2%, although it appears to have flattened in recent years. The energy growth rate, 1994-2002, has been a negative 2%. Revenue has also declined slightly over the same period. Commercial revenue comprises 60% of Con Ed revenue and has declined approximately 3% per year.

As announced on Jun. 3, 2003, Consolidated Edison Company of New York, Inc.—(Con Edison) is investing $522 million this year in upgrades to its electric delivery system for the summer. These upgrades and improvements reflect Con Edison's commitment to continuing to provide the most reliable electric delivery service in the country," said Lou Rana, senior vice president of electric operations for Con Edison. Industry analysts have rated Con Edison as the leading electric utility for reliability, and the company is ranked 10 times more reliable than the national average. With energy supplies continuing to be tight, however, company officials encouraged customers to use energy wisely. The company said the more than a half-billion dollars in improvements this year would help maintain reliable service delivery to the company's 3.1 million business and residential customers in its service area of New York City and Westchester County. The upgrades and improvements include $328 million on the distribution system, including $65 million for upgrades to cables and transformers, $20 million on transmission upgrades, $174 million on substation installation and circuit breakers, 158 miles of underground and aerial feeder cables replaced, 345 thermally sensitive cable joints replaced, 211 new transformers installed, and 20 electrical (4 kV) unit substations enhanced and upgraded.

For discussion of the Con Ed analysis, it is assumed that (1) 80% or $325 million of annual capital expenditures are driven by growth/reliability; and 60% of that $325 million is driven by commercial customer growth, (2) a commercial building EEA portfolio of 1000 MW would allow Con Ed to remove one level of design contingency on related distribution facilities and thereby reduce capital spending, and (3) a commercial building portfolio of 1000 MW could drop its coincident peak load by 20% (achieved in stages over 3 years) and thereby offset 1-2 years growth on the rest of the Con Ed system. 20%×1,000 MW of commercial load=200 MW. 1-2% growth×[10,000 total load−1,000 of commercial load]= 90-180 MW. 200/90=2.2 years, 200/180=1.1 years. This translates into $325-650 million, spread over three years or $100-$200,000 per 1 MW customer per year.

One market development issues is aggregating local loads sufficient to affect the magnitude and timing of specific local substation and distribution system replacement and/or expansion. Con Ed lent credence to this Energy Automation product in July 2003 when it announced it was soliciting bids to reduce peak loads on specifically identified, local distribution busses.

As reported, "Consolidated Edison Company of New York, Inc. (Con Edison) announced today that it has issued a Request For Proposals (RFP) seeking qualified respondents to administer a program aimed at reducing electricity use during peak periods by 125 megawatts over five years beginning May 1, 2004. A reduction in peak energy use of 125 megawatts would represent saving the energy required to power 125,000 homes. The company is seeking to achieve these energy-use reductions in selected neighborhoods throughout its service area. Over the past several years, we have seen power use throughout our service area growing. Supply, however, has remained relatively unchanged. At the same time, energy use in certain neighborhoods has increased at a faster pace than in others. That growth has necessitated electric delivery improvements in those communities sooner than planned,' said Stephen F. Wood, vice president of engineering services for Con Edison."

In this first-of-a-kind program, Con Ed is recognizing the value of peak load reduction to reduce 1) generating capacity expense, 2) transmission capital expenditures, and 3) distribution capital expenditures. The initial program is looking for "permanent" reductions" and so favors technologies such as on-site generation or storage over BAS.

Reducing Distribution System Operating Expense

The "reducing distribution system operating expense" product can be described as follows. Gas and electric distribution systems in large cities are complex to build and complex to operate. For example, the underground transmission systems into city centers provide significant capacitance—a benefit during the day, a cause of high voltage at night. Nighttime commercial building motor loads would greatly benefit electric system operators, even more so if it could be "dispatched" by distribution system operators. As another example, distribution system operators—both gas and electric—could take advantage of the ability to switch commercial heating load between electric and gas supply in order to i) control short-term electric or gas distribution loading; ii) clip system load spikes or slow ramping requirements; or iii) provide gas storage.

Regarding market development issues, these services require commercial building portfolio scale and sophisticated operating coordination with utilities and ISO's (which becomes affordable with scale).

Selling Shaping and Imbalance Services

The "selling shaping and imbalance services" product can be described as selling imbalance and shaping services to other building customers and to other energy service providers out of a large commercial building portfolio. This service follows from a building portfolio's ability to modify its own load shape (as discussed earlier under initial products and services). EnergyConnect will immediately provide a building portfolio with the ability 1) to reduce the utility or energy service provider (ESP) expense and risk of buying shaped products from the market and 2) to self-manage volume risk and imbalance price risk. As the portfolio develops, some buildings will be able to overcompensate—that is, shift energy use sufficiently to also provide shaping and imbalance to other buildings with less flexibility. In terms of market development issues, efficient development calls for adding these "other buildings" to the EnergyConnect portfolio in order to forecast need and value with greater certainty and to reduce transaction costs.

Controlling Distributed Generation

The "controlling distributed generation" product can be described as follows. It is a natural extension for EnergyConnect systems to integrate commercial building and others' on-site generation with electric system markets and operations. Such on-site generation is more valuable as part of an EnergyConnect building portfolio than if considered as a stand-alone resource. For example, on-site generation (1) provides additional benefit to the commercial building portfolio (For example, with on-site generation acting in reserve, a building portfolio can commit more of its capability to ISO markets. That is, the building portfolio will hold fewer buildings in reserve to cover possible, but improbable significant day-ahead or real-time non-performance. On-site generation can also serve to cap a building portfolio's exposure to the market in the event of non-performance) and (2) derives additional benefit from the commercial building portfolio (For example, on-site generators, augmented by the commercial building portfolio, can function like more sophisticated generators. This creates opportunities to participate more often and in more lucrative markets). Regarding market development issues, over time, EnergyConnect programs will mitigate or even eliminate energy price spikes. Such spikes are a significant part of on-site generation profit expectations. Instead, EnergyConnect will provide alternative revenue sources for this generation.

Long Term Option Value

There are several long-term option values that can be provided with Enterprise Energy Automation. These long-term option values include expansion into world markets (see Jones Lang LaSalle map of megacities); provide testing ground for extension of these capabilities to smaller commercial and industrial customers (technology improvements, understanding of cost/benefit, and other meaningful intelligence); technology introduced for these purposes has other uses, none of which could support the cost on its own; provides customers with understanding of supply side competitive issues—further enhancing negotiating position; capturing "free riders" through enhanced capabilities in market structuring, regulatory management, and legislative management; platform for integration of distributed resources with electric/gas system planning and operations; platform for fuel cell entry (natural additions to support additional market power, access to Federal support funds associated with developing hydrogen as a permanent energy source, solution to new Chicago back-up rules—solves space, noise, and pollution problems).

Figure 23:
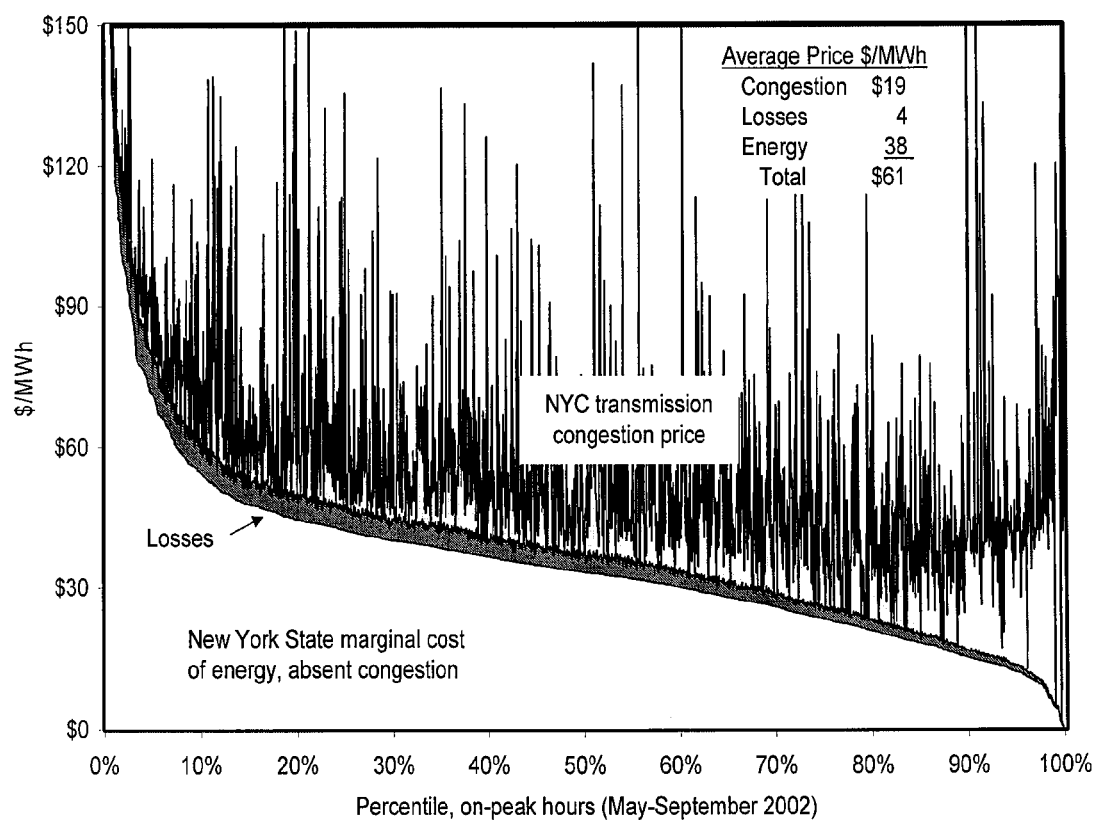
FIG. 23 is a graph showing that transmission congestion into New York City is significant and volatile.

Other long-term option values include a platform for economic energy storage (flow batteries, flywheels, compressed air, and pumped hydro; services (e.g., building envelope evaluation; control equipment mark-up and installation; maintenance of control equipment; central operation of others' building control systems; HVAC equipment maintenance contracts); intra-portfolio markets for service reliability;

increase viability, liquidity, and competitiveness of local wholesale market—low cost virtual generation, low cost services, and increased number of "suppliers" in market mitigates market power; better use, efficiency, and environmental performance from baseload generation—reduced use of coal plants for regulation, ramping, and spinning reserve allows much better tuning and performance of environmental control systems; running at optimal turbine and boiler efficiency points reduces average cost; relegate dirty and inefficient local generation to back-up status; transmission—sufficient peak management will delay need for transmission enhancements and reduce bottlenecks; and tenant satisfaction value and, associated improved lease terms and improved occupancy Backdrop for Initial Markets and Services Because transmission bottlenecks impede access to regional generation, high and volatile energy prices persist in very large cities. For example, in New York City, transmission congestion imposes a significant premium on top of energy prices available elsewhere in the state. FIG. 23 is a graph showing that transmission congestion into New York City is significant and volatile.

Figure 24:
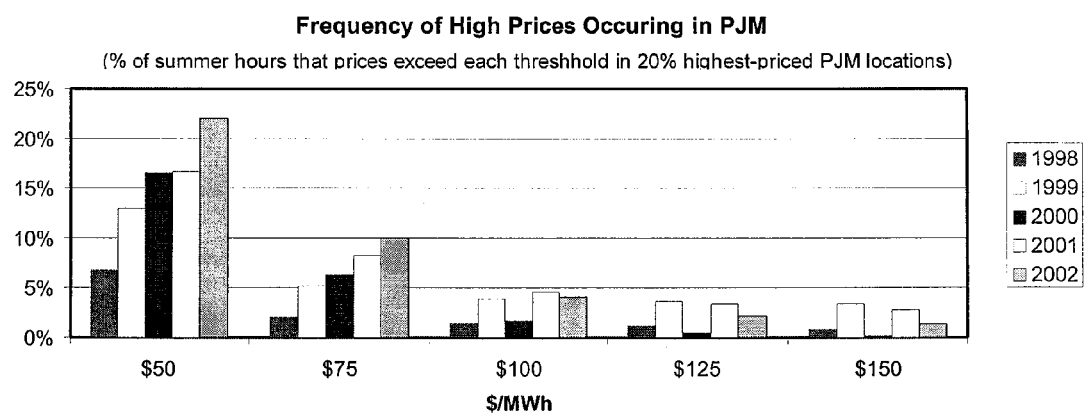
FIG. 24 is a graph showing frequency of high prices occurring in PJM.
Figure 25:
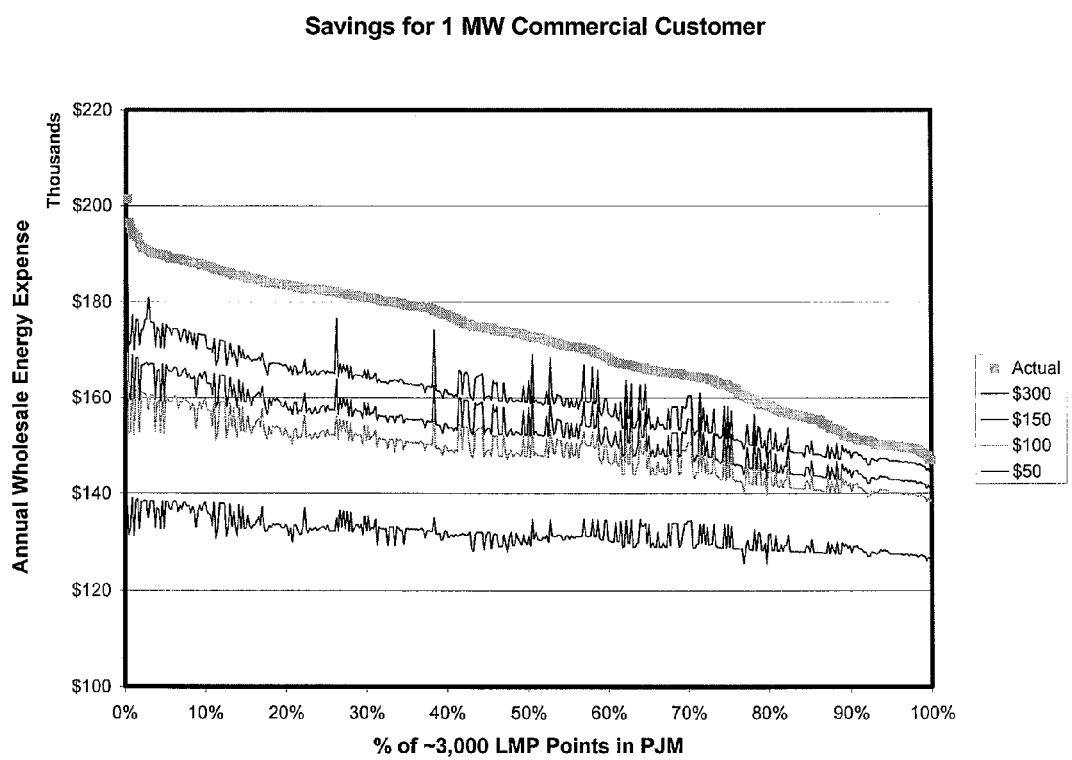
FIG. 25 is a graph showing savings for a 1 MW commercial customer.

Another example is in high-priced locations in PJM, the frequency of high prices has grown steadily, despite the construction of new generation. The chart in FIG. 24 captures five years of summer period history. There is no indication of price mitigation in these locations. Moreover, as the PJM analysis in FIG. 25 indicates, clipping prices and reducing volatility through Energy Automation appreciably reduces energy bills. In FIG. 25, the top line reflects actual wholesale energy expense to serve a 1 MW customer at each of the ~3,000 PJM LMP points (sorted in descending order). Each succeeding line reflects the effect of clipping prices at $300, $150, $100, and $50.

Additional Products Provide Greater Profit Margins

A significant number of additional products have been developed and other are under development. All leverage the base investment. In each market, a different sequence of introduction will be appropriate. EnergyConnect extracts and sells many of these products as a composite of contributions of the entire building portfolio in each market. Some of these products are selling ancillary services to the market, selling peaking capacity equivalent to the market, reducing distribution system capital and operating expenses, arbitraging gas/electric prices, providing electric/gas distribution system control, selling imbalance services, selling load-shedding services, selling frequency control services, and controlling distributed generation.

There can also be extension within existing metropolitan areas. As a large and flexible building portfolio, EnergyConnect will have the ability to address emerging market issues such as providing intra-portfolio markets for service reliability, improving efficiency and environmental performance of baseload generation, relegating old, inefficient local generation to back-up status, reducing need for expensive transmission upgrades into congested metropolitan areas, improving tenant satisfaction and building rentability, integrating distributed resources with electric/gas system planning and operations, and providing platform for fuel cell entry into large metropolitan areas.

Scale Provides Far More than Bargaining Power

Scale benefits EnergyConnect in four ways. First, services are more flexibly carved out of a portfolio—a building portfolio with diverse designs, operating requirements, and capabilities can better match up to one or several of EnergyConnect's profit sources than can a single building. Second, performance reliability meets ISO and utility operating standards—again, an advantage of a portfolio over an individual building, e.g. in meeting strict performance requirements related to ISO ancillary services. Third, learning curve advantages in a rapidly developing market—a large market share means EnergyConnect will learn more quickly than the competition. Fourth, bargaining power, especially to affect the scope and pace of market development—a portfolio provides the ISO or utilities with 1) a critical mass around which they are willing to invest their own resources and 2) greater long-term assurance of availability and stability of customer participation which are critical for long-term resource adequacy decisions.

Building diversity comes in many forms: user sensitivities, specific location, scope and time of energy use, motor load, vintage construction, design and efficiency of heating and cooling systems, control sophistication, owner and manager business philosophies, etc. This means that buildings are not equally suited to participate in any one program or market on any given day. Also, a building's suitability for a particular service can differ by season or evolve over time.

EnergyConnect Markets Enhanced by Regulatory Expectations and Actions

As stated by William L. Massey, FERC Commissioner, on Sep. 26, 2002, "... a robust demand response is largely absent from electricity markets, yet it is an important means of moderating prices. Fortunately, getting a level of demand response sufficient to counteract price run ups is not insurmountable. Studies indicate that we need only about 5 to 10% of demand to be effective. I believe that good market operation will require this. Demand responsiveness, when developed, can also be an important factor in determining generation and transmission adequacy and in congestion management."

FERC and state regulatory bodies encourage demand response through a variety of market and institutional measures. Accelerated application of LMP will create price signals for the value of energy and services at different locations and times. Biddable demand reductions, interruptible load, real-time pricing, and other load management programs will be instrumental in achieving resource adequacy. Customer participation in ancillary service markets will free generation resources for other purposes. Customer participation will mitigate generation market power for which there is otherwise no easy solution.

Demand participation in power markets provides greatest value in transmission constrained metropolitan areas —EnergyConnect's target market. Large metropolitan areas have not benefited from the recent generation construction boom. Generation construction is incredibly difficult and costly in metropolitan areas, and transmission bottlenecks impede access to remote generation. Customer participation and other distributed resources are the long-term solution in such metropolitan areas.

The forgoing detailed description has described only a few of the many possible implementations of the present invention. For this reason, this detailed description is intended by way of illustration, and not by way of limitation. It is only the following claims, including all equivalents, that are intended to define the scope of this invention.

What is claimed is:

1. A computerized method for enterprise energy automation, the method comprising, at a computer:
 (a) monitoring data from an energy supply and delivery system;
 (b) extracting data from a plurality of building automation systems in a group of buildings;

(c) determining an energy performance model for each of the plurality of building automation systems using the extracted data from the plurality of building automation systems, wherein each energy performance model comprises a speed of response to a load shifting strategy and a magnitude of load shifting available;

(d) using the energy performance model for each of the plurality of building automation systems to build a portfolio-wide energy performance model defining a flexibility of the portfolio of buildings on both a day-ahead and real-time basis;

(e) determining an optimum operating strategy for the plurality of building automation systems using the portfolio-wide energy performance model and pricing information received as a part of the monitored data from the energy supply and delivery system; and (f) sending a bid to the energy supply and delivery system for an energy supply and delivery system product as a part of the determined optimum operating strategy.

2. The method of claim 1, wherein the data from the energy supply and delivery system and the data from the plurality building automation systems are received via the Internet.

3. The method of claim 1, wherein the data from the energy supply and delivery system and the data from the plurality building automation systems are received continuously.

4. The method of claim 1, wherein the data from the plurality building automation systems includes meter data.

5. The method of claim 1, wherein the data from the plurality building automation systems includes occupancy data.

6. The method of claim 1 further comprising receiving local weather data for the group of buildings and applying the local weather data to the energy performance model for each building as a part of the determination of the optimum operating strategy.

7. The method of claim 1, wherein the data in (a) comprises status of one or more of the following: a transmission line, a generating plant, and a distribution system.

8. The method of claim 1 further comprising:
   (g) receiving an acceptance of the bid from the energy supply and delivery system; and
   (h) executing the determined optimum operating strategy.

9. The method of claim 8 further comprising:
   (i) providing compensation for the one or more buildings.

10. The method of claim 9, wherein the compensation comprises a share of utility tariff demand savings.

11. The method of claim 9, wherein the compensation comprises a share of ESP demand charge savings.

12. The method of claim 9, wherein the compensation comprises utility interruptible program payments.

13. The method of claim 9, wherein the compensation comprises ISO demand response program payments.

14. The method of claim 9, wherein the compensation comprises capacity sales within ISO-sponsored markets.

* * * * *